(12) United States Patent
Reynolds

(10) Patent No.: US 7,147,596 B2
(45) Date of Patent: Dec. 12, 2006

(54) LOW-MASS ROLLER OR PULLEY

(76) Inventor: Ronald W. Reynolds, 2223 Southern Cir., Carrollton, TX (US) 75006

( * ) Notice: Subject to any disclaimer, the term of this patent is extended or adjusted under 35 U.S.C. 154(b) by 246 days.

(21) Appl. No.: 10/086,153

(22) Filed: Feb. 26, 2002

(65) Prior Publication Data

US 2003/0162641 A1    Aug. 28, 2003

(51) Int. Cl.
*B25F 5/02* (2006.01)
(52) U.S. Cl. ............... 492/40; 492/39; 492/45
(58) Field of Classification Search ............ 492/56, 492/45, 40, 39; 193/37; 29/892, 892.1; 474/94, 172, 174, 191
See application file for complete search history.

(56) References Cited

U.S. PATENT DOCUMENTS

| | | | | |
|---|---|---|---|---|
| 3,010,332 A | * | 11/1961 | Skates | 474/184 |
| 3,522,643 A | * | 8/1970 | Winkler | 492/49 |
| 3,559,782 A | * | 2/1971 | Lesley et al. | 193/37 |
| 3,693,544 A | * | 9/1972 | Trzyna | 101/375 |
| 3,750,246 A | * | 8/1973 | Pessen | 492/6 |
| 4,062,098 A | * | 12/1977 | Brugman | 226/191 |
| 4,841,613 A | * | 6/1989 | Beery et al. | 492/50 |
| 4,864,343 A | * | 9/1989 | Nelson | 396/584 |
| 5,133,125 A | * | 7/1992 | Diebels et al. | 29/527.2 |
| 6,846,277 B1 | * | 1/2005 | Lehner-Dittenberger | 492/42 |

* cited by examiner

*Primary Examiner*—Marc Jimenez
(74) *Attorney, Agent, or Firm*—Howison & Arnott, L.L.P.

(57) ABSTRACT

A low-mass roller is disclosed comprising a cylindrical body formed of polymeric material and having an exterior surface, first and second open ends and defining an interior tubular space along a longitudinal axis therethrough for receiving an axle; and an outer shell formed of thin metal covering the exterior surface of the cylindrical body. In another aspect, the outer shell of the low-mass roller comprises an assembly of first and second tubular shells having inside diameters, equal within a predetermined tolerance, at first respective ends thereof, wherein the first respective ends are joined together and welded. The assembly of the first and second tubular shells includes a weld ring disposed between and nested within the first respective ends of the first and second tubular shells such that the shells are held together in alignment during the welding process.

44 Claims, 11 Drawing Sheets

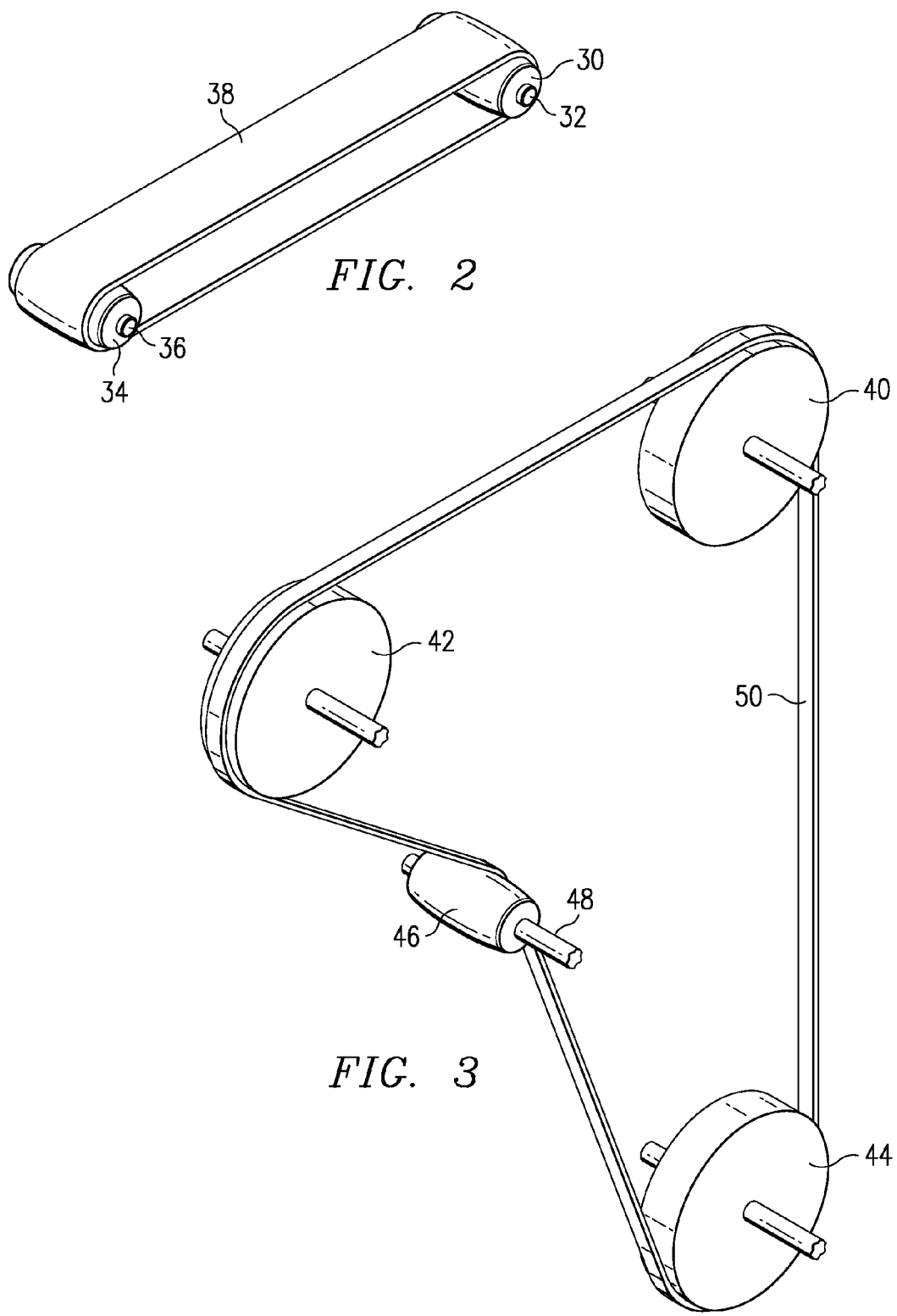

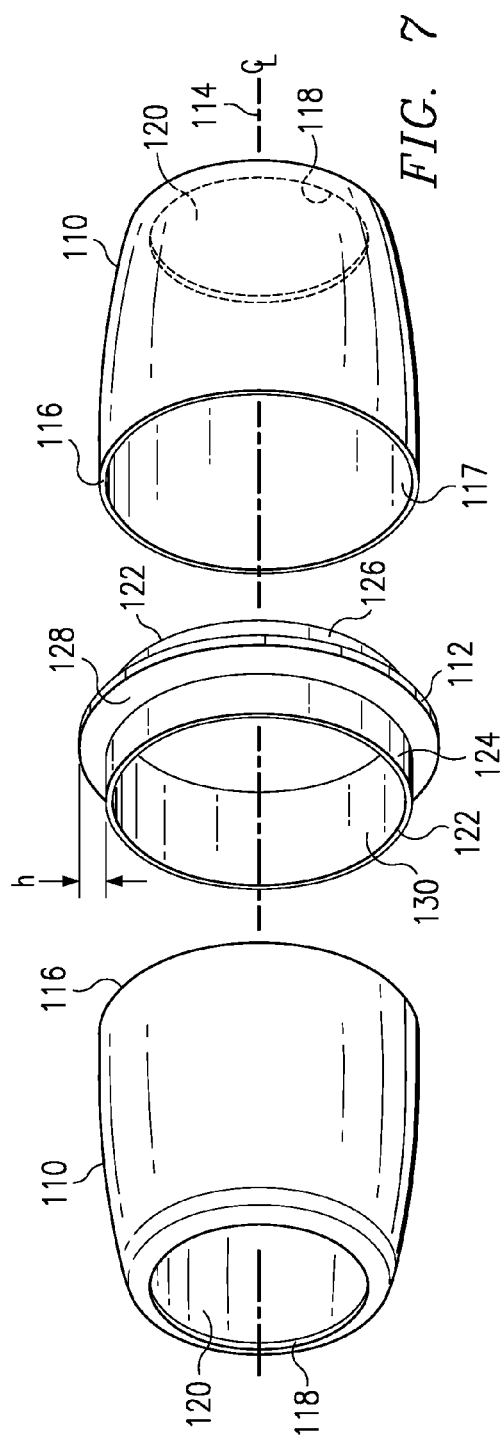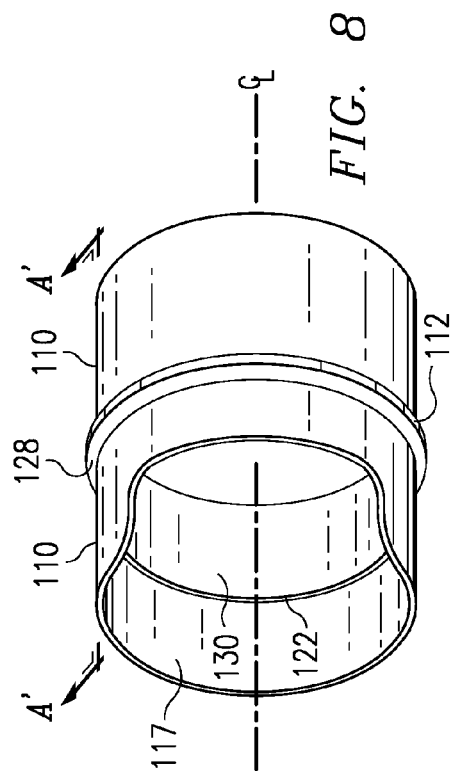

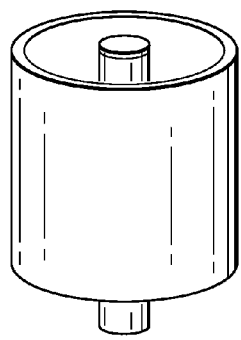
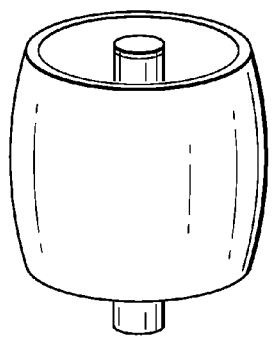
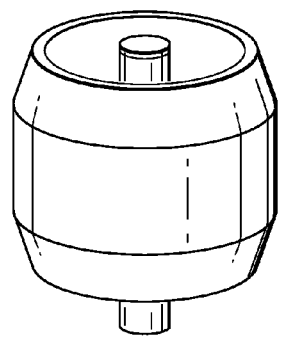
FIG. 16A      FIG. 16B      FIG. 16C
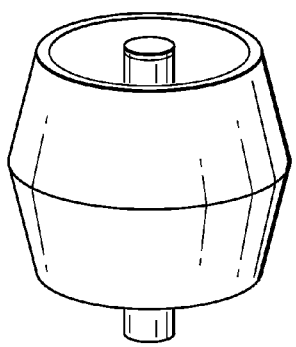
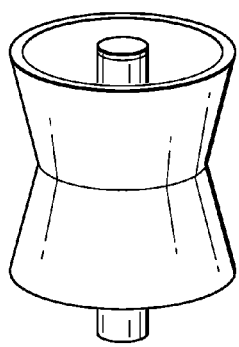
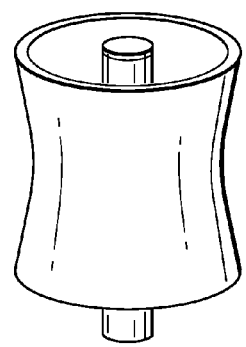
FIG. 16D      FIG. 16E      FIG. 16F
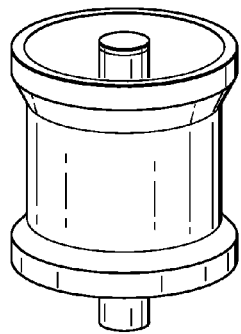
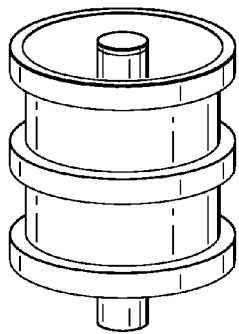
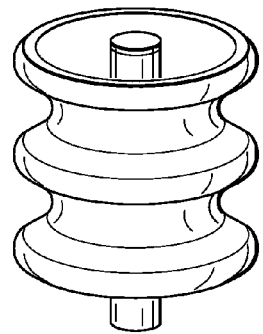
FIG. 16G      FIG. 16H      FIG. 16I

US 7,147,596 B2

LOW-MASS ROLLER OR PULLEY

TECHNICAL FIELD OF THE INVENTION

The present invention disclosed herein pertains in general to rollers and pulleys for use with industrial equipment and, more particularly, to rollers and pulleys having low-mass for use in machines using flat belts, machines for sorting and transporting mail articles, conveyor systems and the like.

BACKGROUND OF THE INVENTION

Cylindrical rollers and pulleys find many uses, for example as pulleys or guide or drive rollers in letter extracting or sorting machines, as pulleys or idlers in flat belt drive systems, or as rollers in beltless or belted conveyor systems to list just a few basic uses. Examples of some of these applications are shown in FIGS. 1A, 1B and 1C, 2 and 3. Applications of these basic types of uses illustrated in FIGS. 1A, 1B and 1C, 2 and 3 may be found in many variations. The shape of the roller may be crowned or "barrel-shaped," straight sided, or having a cone profile or other cross-section depending on the application. A crown profile provides self-alignment or self-tracking of the flat article of belt in contact with the roller; a straight profile is suitable when the alignment is otherwise provided in the application.

Referring to FIG. 1A, there is illustrated a top view of a pair of rollers shown in a typical application of moving a thin planar object in the direction of the arrow. One or both of the rollers may be driven and the rollers may have a straight cylindrical cross-section or they may be crowned. A first roller 10 rotates on an axle assembly 12 about a longitudinal axis 14 in the direction shown by arrow 16. Similarly, second roller 18 rotates on axle assembly 20 about the longitudinal axis 22 in the direction shown by arrow 24. A thin planar object 26 such as a letter in a mail sorting machine encounters the pair of rotating first and second rollers 10, 18 and is caused to move in the direction of arrow 28 which is a common operation in a mail sorting machine.

FIG. 1B illustrates the apparatus of FIG. 1A from an end view taken through section A'—A' wherein the thin planar object 26 is moving in a direction out of the page toward the viewer. In FIG. 1B the first roller 10 and the second roller 18 are each shown as having a crowned surface shape. This shape is typically used in applications to provide a self-aligning action as the rollers impart the moving force to the thin planar object or letter 26 by the action of the rotating rollers 10, 18. The axle assemblies 12, 20 shown in FIGS. 1A and 1B are greatly simplified and represent a wide variety of axle assemblies both driven and passive that may be found in such applications. Several of these axle assemblies will be illustrated and described in detail hereinbelow.

FIG. 1C illustrates a perspective of one example of a letter transport belt-and-pulley system which utilizes rollers or pulleys as described herein. A deck plate 11 includes two subsystems of a flat belt 15 disposed around a series of pulleys 13. One or more of the pulleys 13 are driven and the remaining pulleys 13 are roller pulleys. The belts 15 are driven in the direction shown by the arrows 17, which causes a letter 19 to be transported in the direction 21.

FIG. 2 illustrates a perspective view of a flat belt and pulley system using a pair of crowned rollers. A first crowned roller 30 rotates about an axle assembly 32 and a second crowned roller 34 rotates about an axle assembly 36. A flat belt 38 installed upon the pair of crowned rollers will remain in alignment on the pulleys because of the crowned profile of the pulleys when one of the pulleys is rotated by a motive force (not shown). The concept of a flat belt pulley system as illustrated in FIG. 2 is found in many applications in industrial facilities and machinery. It may also find widespread use in conveying systems, in farming and other manufacturing applications.

FIG. 3 illustrates another application that utilizes a roller as an idler pulley in a serpentine belt drive system such as is found on automotive engines. There, the single belt is used to operate various accessories such as a water pump, a generator or alternator, a power steering pump or an air conditioning compressor and the like. The belt, illustrated in FIG. 3 as a flat belt, is disposed around first, second and third pulleys 40, 42 and 44 respectively as well as an idler pulley 46 which rotates on axle assembly 48. The idler pulley 46 may be a cylindrical roller of the type shown in FIGS. 1 or 2 and which will be discussed in detail hereinbelow. In the illustrated application, the idler pulley is used for maintaining the belt tension in a multiple pulley system.

In FIG. 4, a prior art roller shown in cross-section with respect to a centerline through the axle assembly is illustrated. In FIG. 4, a roller 52 is mounted on an axle assembly 54 which is installed in a hollow cylindrical space 68 within the roller 52. The axle 54 is supported within the space 68 along centerline 56 by a pair of ball bearings 58 which are set against shoulders 64 machined into the ends of the roller body 52 and retained by opposing pairs of conical washers 60 held in a compressed configuration by the retaining rings 66 on each end of the axle bearing assembly 54. The conical washers provide the pre-loading necessary for smooth operation. In FIG. 4, the conical washers 60 are disposed as one pair on each bearing to provide center loading of the bearings 58. The ball bearings 58 are of conventional type and are readily available through a number of suppliers.

The type of prior art roller shown in FIG. 4, often found in the applications such as FIGS. 1A, 1B and 1C, 2 and 3, typically formed by molding, die casting or machining from solid bar stock or thick walled tube stock from materials such as steel, aluminum, brass or even stainless steel. In the case of die casting, the materials most often used are aluminum or zinc whereas for molded pulleys or rollers, plastic materials may be used. In the case of aluminum or zinc or plastics used as the material for fabricating the roller, these materials lack surface hardness or resistance to pitting or other damage without special treatments that add to their cost. Further, plastic rollers or pulleys are electrically non-conductive and therefore tend to accumulate static electrical charge which can be hazardous because of the risk of fire if flammable materials are nearby. Static charge can also attract and accumulate dust which is an impairment to the performance of the pulley and belt systems. Of these materials, the aluminum provides good electrical conductivity and is very light in weight. However, its relatively poor wear resistance is a drawback to its use. Rollers which have a high wear resistance as well as durability and electrical conductivity are typically made out of steel. However, steel is a heavy material and usually requires a surface coating or plating to protect it from rust or corrosion. Stainless steel provides the resistance to rust and corrosion but is also heavy and is significantly more expensive than the other materials.

Referring further to FIG. 4, each pair of conical washers 60 is used by placing one washer with its concave side facing the concave side of the other washer, the combination being held in compression by the retaining ring 66 which clamps the pair of conical washers on each side of bearing 58 against the inner race of the bearing 58. In other applications, one of the pairs of conical washers 60 may be eliminated to provide single ended loading to the axle assembly. The roller 52 of FIG. 4 is shown as having a solid body which is typical of prior art rollers or pulleys of the cylindrical configuration. As described hereinabove, the roller is typically formed by molding, die casting or machining from solid stock and the cylindrical space along the centerline 56 is provided by boring or other machining operations to provide the particular configuration needed to retain the bearing assembly for a specific application. Among the disadvantages of the prior art roller shown in FIG. 4 are its weight, its relatively high cost of manufacture and its poor resistance to corrosion and wear without special additional surface treatments. The weight is a factor because the inertia of the rotating mass places a greater load upon the driving machinery such as electric motors. Thus, benefits to be gained by lower mass in the roller assembly include smaller motors used to drive the machinery as well as less electricity to operate the motors. Lower mass also results in reduced stress and wear on bearing assemblies and upon belts used with the rollers or pulleys.

To summarize, prior art cylindrical rollers are used in a wide variety of sizes, shapes and materials. Rollers intended for industrial or long term uses are typically machined, or cast and machined, from solid stock for durability. In letter sorting machines for example, rollers may be solid aluminum which provides light weight and relatively light loading on the drive rotors especially when accelerating or decelerating, etc. However, aluminum requires a surface plating or other treatment such as hard anodizing to inhibit corrosion and provide improved resistance to denting and other surface damage because of its inherent lack of hardness. Plated steel or stainless steel provides the necessary corrosion resistance and surface durability for cylindrical rollers and pulleys but these materials are relatively heavy and require stronger supporting structure and drive motors as well as greater energy requirements for their operation. Solid metal of most common and practical materials are also noisy in operation because of their natural resonance, i.e., they "ring," and because their greater mass places greater loads on the drive apparatus. Solid rollers or pulleys are also expensive to manufacture because of the relatively high cost of casting and machining. In many applications the rollers must be metallic in order that accumulation of static electric charge may be prevented.

What is needed therefore is a lightweight roller or pulley that is manufactureable at very low cost yet very durable, quiet in operation, resistant to static electricity accumulations and is adaptable to a wide variety of applications.

SUMMARY OF THE INVENTION

The present invention disclosed and claimed herein, in one aspect thereof provides a low-mass roller or pulley comprising a cylindrical body having an exterior surface, first and second open ends and defining an interior tubular space along a longitudinal axis therethrough for receiving an axle, the cylindrical body being formed of polymeric material; and an outer shell formed of metal proximately covering the exterior surface of and having a formed circular opening surrounding each said first and second ends of said cylindrical body, wherein the cylindrical body, the outer shell and the circular openings are concentric with the longitudinal axis.

In another aspect, the rigid outer shell of the low-mass roller comprises first and second tubular shells having inside diameters, at first respective ends thereof, equal within a predetermined tolerance wherein the first respective ends are joined together and welded. The assembly of the first and second tubular shells includes a weld ring having an outside diameter just smaller than the inside diameters of each of the first respective ends of the first and second tubular shells, the weld ring being disposed between and nested within the first respective ends of the first and second tubular shell such that the shells are positioned together and held in alignment during the welding process.

There is also disclosed herein a method for making a low-mass roller comprising the steps of forming a thin-walled cylindrical outer shell of the low-mass roller of metal, the outer shell having an exterior surface and an interior surface and a longitudinal axis coincident with an axis of rotation of the low-mass roller, the outer shell further having first and second ends; and forming a hollow body in situ within the outer shell, of a polymeric material, such that the assembly of the outer shell and the hollow body remain in contact with the interior surface of the outer shell and further such that the hollow body defines a cylindrical axial space surrounding and coincident with the axis of rotation for receiving an axle. In another aspect of the present invention, the step of forming a thin-walled cylindrical outer shell comprises forming first and second rigid tubular shell sections of the thin-walled metal, having inside diameters, at first respective ends thereof, equal within a predetermined tolerance, assembling the first respective ends of the first and second tubular shell sections upon a weld ring disposed between the first respective ends of the first and second tubular shell sections; and welding the assembled first and second tubular shell sections and weld ring together. In another aspect of the present invention, the step of forming a hollow body comprises the step of providing a wall thickness of the hollow body substantially greater than the wall thickness of the thin-walled outer shell.

In another embodiment there is disclosed a weld ring for joining first and second round, thin-walled tubes of a like inside diameter and like material, comprising a band of the like material having first and second parallel edges, an outside diameter equal to or slightly less than the inside diameter of the first and second tubes; and a circumferential ring of the like material extending orthogonally outward by a height greater than the tube wall thickness from the outside diameter around the band and disposed approximately midway between the first and second parallel edges of the circular band portion; wherein the circular band portion and the circumferential ring portion are formed as one piece of the like material. In another aspect the weld ring is inserted in nested relationship within a first respective end of each of the first and second tubes wherein each of the first respective ends of the first and second tubes is butted up against a proximate side of the circumferential ring portion of the weld ring. In yet another aspect of the present invention, the weld ring and the first and second thin-walled tubes are fabricated from stainless steel.

In another embodiment there is disclosed a method for joining first and second thin-walled tubing sections having equal cross-section dimensions comprising the steps of cutting a first end of a first thin-walled tubing section to be joined at a first angle with respect to the longitudinal centerline of the first tubing section; cutting a first end of a second thin-walled tubing section to be joined, at the first angle with respect to the longitudinal centerline of the second tubing section; and assembling the first ends of the first and second thin-walled tubing sections together end-to-end and overlapping respective sides of an outer surface of a weld ring disposed in a nesting relationship therewith, wherein the weld ring includes a circumferential ring portion around the outer surface of the weld band extending outward from the outer surface of the weld band at the first angle with respect to the longitudinal centerline of the joined first and second thin-walled tubing sections such that the circumferential ring portion of the weld ring is disposed between the respective first ends of the first and second thin-walled tubing sections.

BRIEF DESCRIPTION OF THE DRAWINGS

For a more complete understanding of the present invention and the advantages thereof, reference is now made to the following description taken in conjunction with the accompanying Drawings in which:

FIG. 2 illustrates a perspective view of a flat belt and pulley system;

FIG. 3 illustrates a perspective view of a flat or serpentine drive belt with an idler pulley;

FIG. 7 illustrates an exploded perspective view of the components of an outer shell according to the present disclosure;

FIG. 8 illustrates a partial cutaway perspective view of the center portion of the outer shell components after assembly;

FIGS. 16A through 16I illustrate several examples of profiles for low-mass rollers or pulleys according to the present disclosure.

DETAILED DESCRIPTION OF THE INVENTION

Figure 5:
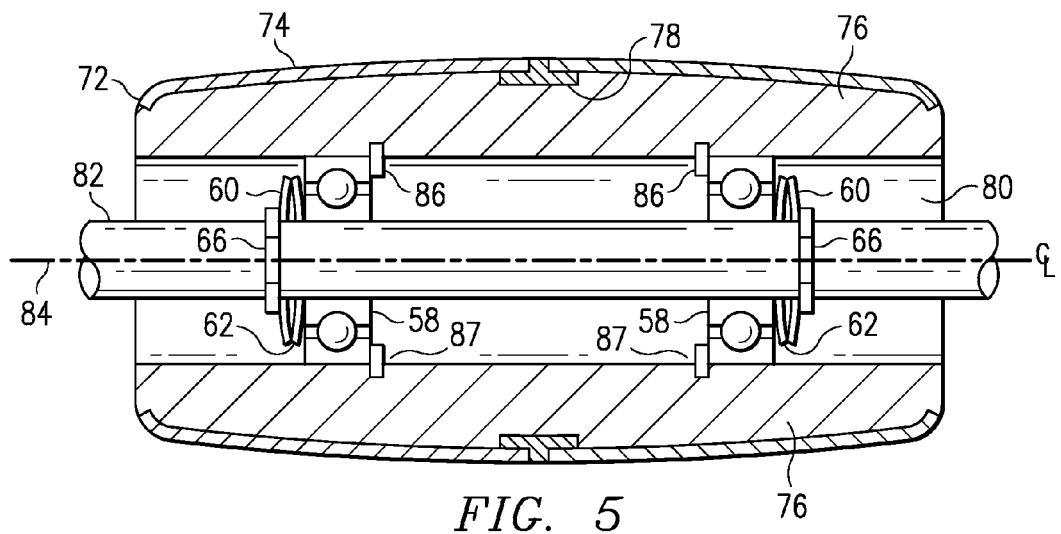
FIG. 5 illustrates a longitudinal cross-section of a low-mass roller according to one embodiment of the present disclosure.

Referring now to FIG. 5, there is illustrated a longitudinal cross-section of a low-mass roller according to one embodiment of the present disclosure. In this roller design, an outer shell is fabricated of thin-walled stainless steel and a hollow body of a polymeric material is molded within the outer shell. This construction provides the advantages of very low mass as well as the durability, corrosion resistance and wear resistance of the stainless steel shell without requiring other surface treatment or plating as with other materials. For example, in one embodiment of a low-mass roller having an outside diameter of 1.69 inches, the wall thickness of the thin-walled outer shell may be approximately 0.035 inches. The length of such a roller way vary widely; in the embodiments described herein the length may vary from less than an inch to several inches long. It should be noted however that these dimensions are intended to be illustrative and not limiting. In practice, the low-mass roller of the present disclosure may be produced in a wide range of sizes. The wall thickness of the outer shell may generally be less than or equal to one-twentieth of the diameter of the outer shell. However, wide variation of this ratio is permitted and will generally depend upon the application.

The polymeric hollow body of the low-mass roller of FIG. 5 may be fabricated from a wide choice of materials having various properties that suit the particular application. For example, the polymer material used in the body may be made conductive through the addition of carbon fibers or other conductive additives impregnated into the material which provides the ability to prevent the accumulation of static charge in the roller during operation. One example of the thermoplastic composites useful for electrostatic dissipation is the Stat-Kon® line of materials available from LNP Engineering Plastic Inc. of Exton, Pa. In other applications where quiet-running rollers are required, an acoustically non-resonant polymer material may be used.

Figure 1A:
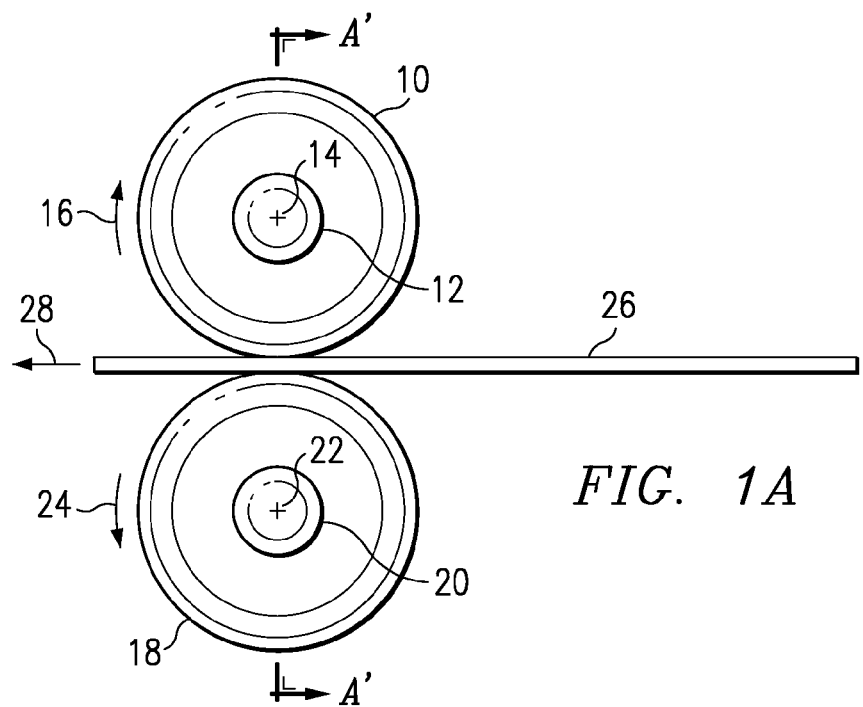
FIG. 1A illustrates a top view of a pair of rollers shown moving a thin planar object in the direction of the arrow.
Figure 1B:
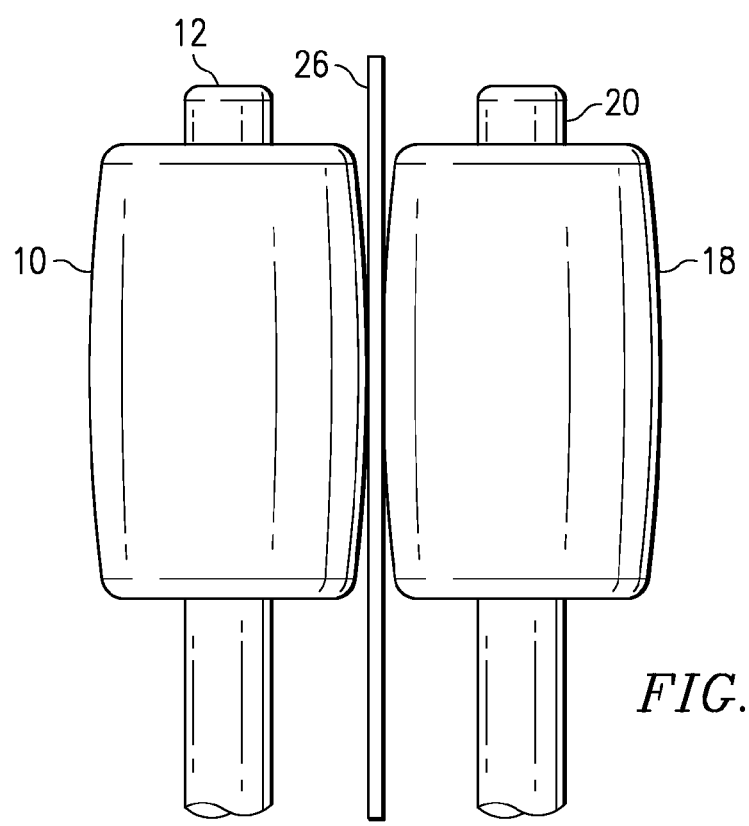
FIG. 1B illustrates an end view A'—A' of FIG. 1A of the thin planar object moving toward the perspective of the viewer.
Figure 1C:
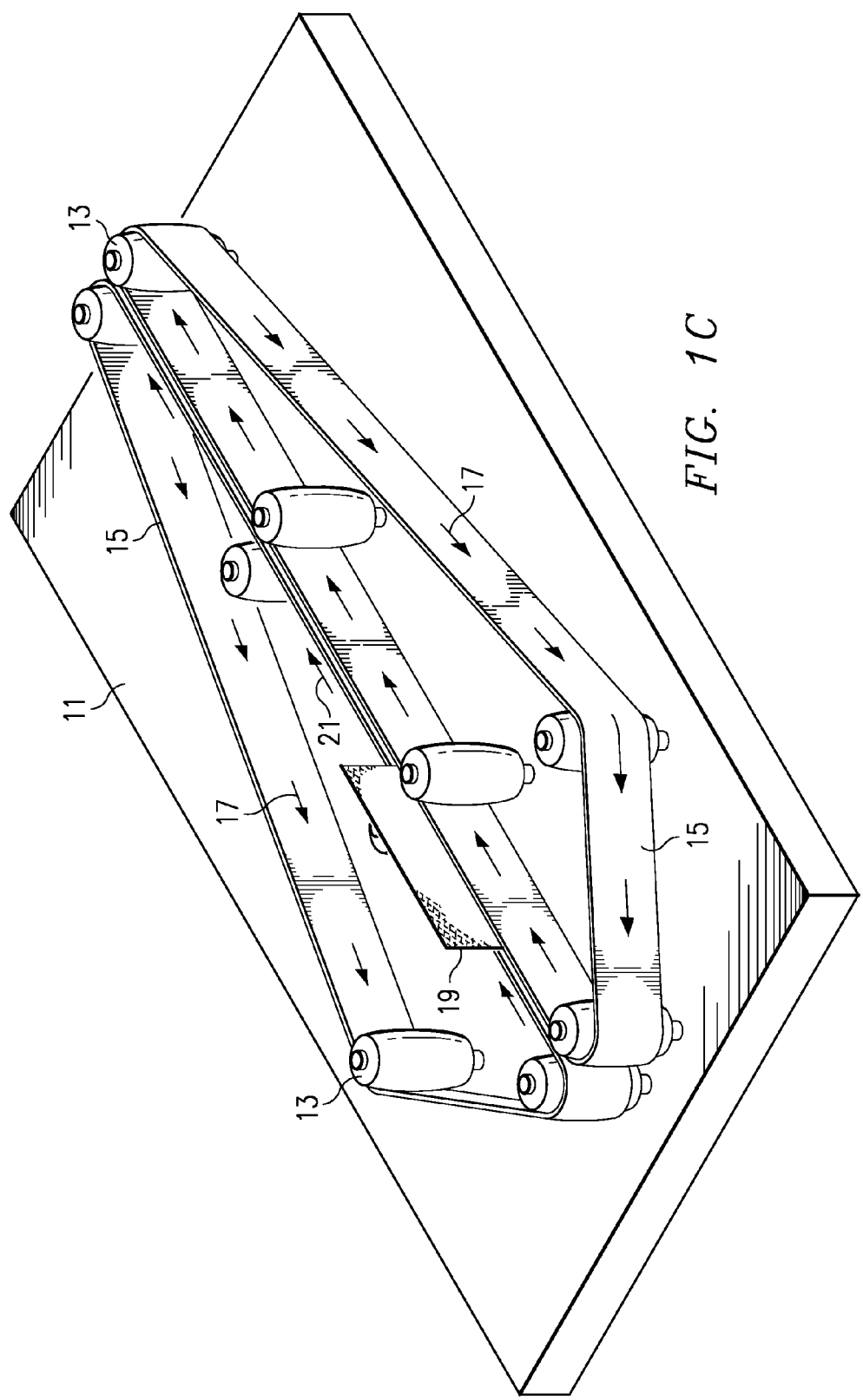
FIG. 1C illustrates a perspective view of a letter transport belt-and-pulley system.
Figure 4:
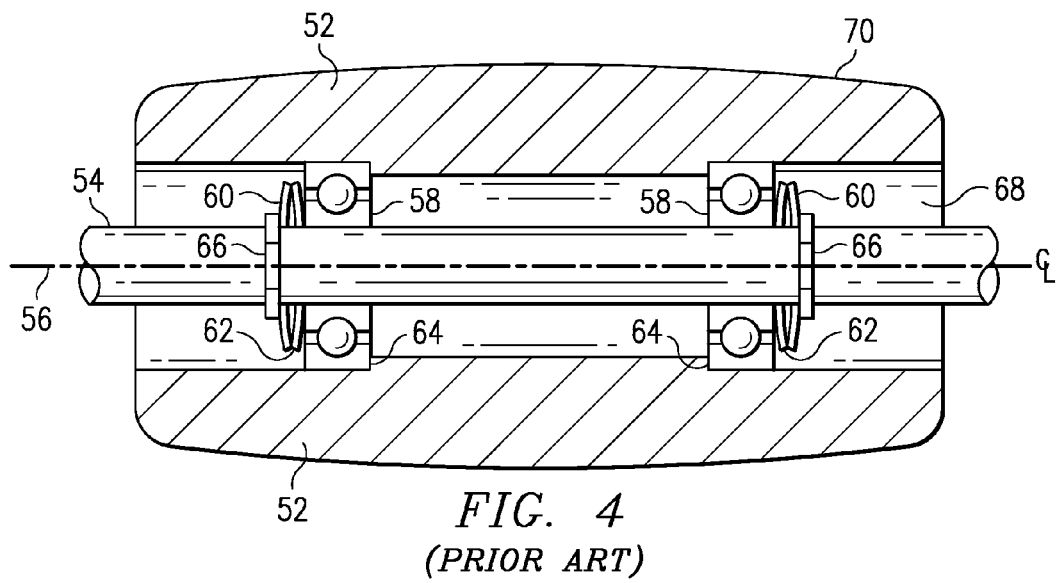
FIG. 4 illustrates a longitudinal cross-section of a typical prior art roller having a solid body.

Continuing with FIG. 5, the low-mass roller 72 is shown having a thin-walled outer shell 74 which encloses a hollow body 76. The thin-walled outer shell is fabricated of two parts joined together by a weld ring 78 as will be described hereinbelow. The roller 72 is mounted on an axle assembly 82 installed in the hollow cylindrical space 80, alternately called bore 80, within the hollow body 76 and centered upon centerline 84 as shown in FIG. 5. The bearing assembly may be similar to that shown in FIG. 4 and represents one of many possible bearing assemblies that may be used to support a roller or pulley of the low-mass type disclosed herein. For example, the bearing shown in the embodiment of FIG. 5 may be an "electric motor bearing" selected for the high duty cycle imposed on the bearings in these types of applications. Such bearings may be sealed or shielded and are offered by various manufacturers, including SKF, IKS or EZO, for example. Alternatively, in place of the ball bearings 58, solid bushings may be used for low speed applications having relatively low stresses on the bearing in which quiet operation is a requirement. The bearing assembly portions of FIG. 5 bear the same reference numbers for the various components as described for the bearing assembly of FIG. 4 hereinabove.

The conical rings 60, used in opposing pairs in FIG. 5, also referred to as disk springs, are used to preload the bearings 58 to provide quieter operation and extend bearing life. Disk springs are available from manufacturers such as Bauer and Schnorr. An alternative to a disk spring in some applications is a type of spring known as a "wave washer," so named because of its wave configuration. The retaining rings or lock rings 66, commonly also used in automotive and appliance applications, are available from various manufacturers under the name Roto-clip, Tru-arc and others. In FIG. 5, each bearing 58 is held in position at its interior side against the outer race of the bearing by lock rings 86 disposed in slots 87 machined into the hallow cylindrical space 80 of the hollow body 76. Lock rings 86 may be of the same type as lock rings 66 described hereinabove. The overall shape or profile of the outer shell 74 and of the low-mass roller 72 is shown in FIG. 5 in planar cross-section as a crowned configuration having a larger diameter near the central portion of the roller 72 and a smaller diameter near the ends of the roller 72. Generally, the profile of a crowned roller is symmetrical, with one end being the mirror image of the other. Also shown in FIG. 5 are the lips 88 and 89 at the ends of the outer shell wherein the outer shell curves around the end of the roller and extends inward toward the longitudinal axis or centerline 84 by a small amount. The profile of this lip may be curved as shown in FIG. 5 or it may be, for example, disposed at a right angle from the rest of the outer shell 74 between the ends. The lips 88 and 89 may be disposed fully around the circumference of the outer shell 74 and hollow body 76.

The low-mass roller shown in FIG. 5 employs a minimal amount of stainless steel in combination with a polymer body and requires only a minimal amount of machining in its fabrication. Further, by varying the type of polymer materials used, various properties such as reduced static electricity accumulation or noise of operation may be designed into the particular roller. Its lower mass provides the benefits of reduced drive motor size and reduced energy use without sacrificing durability or performance. For example, a low-mass roller of the type shown in FIG. 5, having a thin-walled outer shell of stainless steel and the polymeric body construction, has roughly the same mass as a solid aluminum roller and also the durability of a solid stainless steel roller. In addition, the roller of FIG. 5 is less expensive to manufacture than rollers fabricated from either solid aluminum or stainless steel. The selection of a particular stainless steel is non-critical and depends on the application. However, both series 300 austenitic, which is non-magnetic, or series 400 marsenitic, which is magnetic, may be used, again depending on the application. While stainless steel in general provides a surface that is durable and highly resistant to corrosion, there are coatings which can be applied to improve the wear resistance or to make the surface of the rollers hypoallergenic for certain applications. Another property of the thin-walled stainless steel is its ability to be irradiated for sterilization purposes.

Figure 6A:
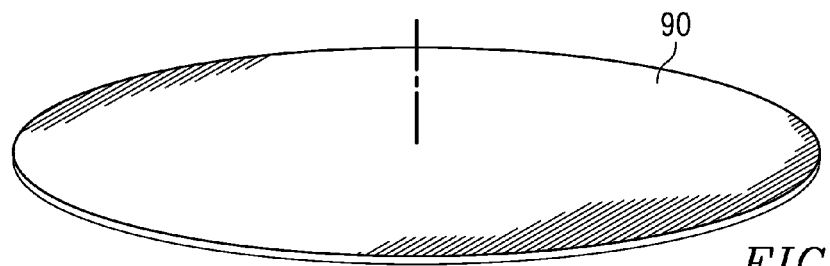
FIG. 6A illustrates a front perspective view of a round blank of stainless steel sheet prior to a drawing operation.
Figure 6B:
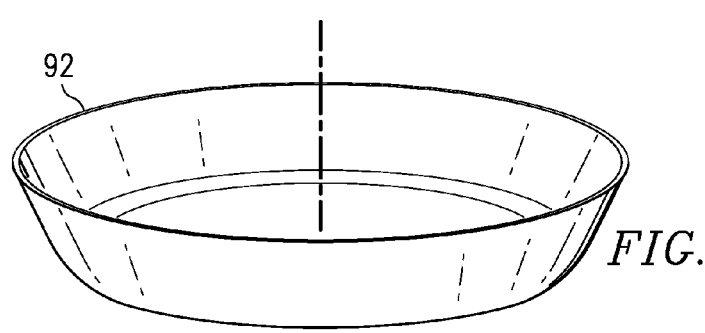
FIG. 6B illustrates the blank of FIG. 6A as it appears at an intermediate stage during the drawing operation.
Figure 6C:
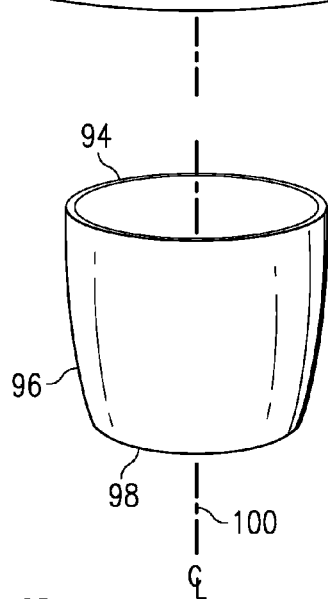
FIG. 6C illustrates a completed shell section drawn from the blank of FIG. 6A with a longitudinal axis indicated by a centerline.
Figure 6D:
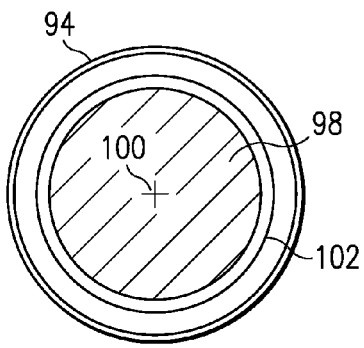
FIG. 6D illustrates the view looking inside the drawn shell from the open end before the bottom or closed end is punched out.
Figure 6E:
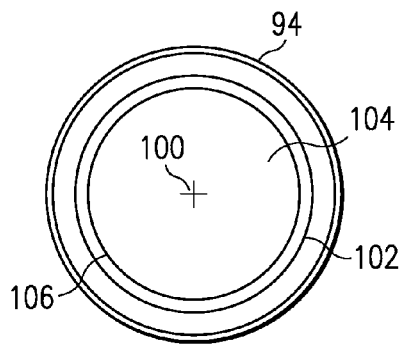
FIG. 6E illustrates the view from the open end as in FIG. 6D after the bottom end has been punched out.

Referring now to FIGS. 6A through 6E, there is illustrated a series of figures showing the fabrication of a stainless steel thin-walled outer shell used in the manufacture of the low-mass roller of the present disclosure. This series of drawings in FIG. 6 illustrates several steps in the fabrication of a thin-walled outer shell having a crowned or convex profile or contour in a deep drawing or a deep draw stamping operation. Other contours such as concave, conical, straight or other profiles such as illustrated in FIGS. 16A through 16I hereinbelow may require different fabrication processes, which are well known to persons skilled in these arts. FIG. 6A shows a perspective view of a round blank 90 of stainless steel sheet which is sized to permit deep drawing of the thin-walled outer shell while minimizing wasted material. In FIG. 6B is shown a front perspective view of the blank part way through the drawing process wherein the blank has become shaped somewhat like a shallow dish 92. Upon further drawing the work piece becomes the cup-shaped shell 96 shown in FIG. 6C. In FIGS. 6A, 6B and 6C the various stages of the fabrication process are shown in relation to the centerline 100. In FIG. 6D there is shown an end view from the open end 94 of the shell 96 looking toward the bottom of the shell 96 along the centerline 100. The circle 102 represents the smaller inside diameter of the shell 96 at the bottom end of the shell and the hatched area 98 represents the bottom portion of the shell which will be removed in a subsequent step to provide the open end of one end of the thin-walled outer shell section. In FIG. 6E is shown the same view as in FIG. 6D wherein the bottom of the cup has been removed providing the opening 104 which is the space within the open end of the thin-walled outer shell 96 defined by the circle 106 representing the opening at the bottom of the thin-walled outer shell 96. In the case of a crowned roller the inside diameter 102 of the thin-walled outer shell 96 is less than the inside diameter at the opposite end at 94.

Referring further to FIGS. 6A through 6E, the thin-walled outer shell 96 may be fabricated by other means, for example, a stamping process may be used particularly for rollers which do not have a large length to diameter ratio. As will be described, one embodiment of a thin-walled outer shell for a low-mass roller of the present disclosure is fabricated of two such cup-shaped, thin-walled outer shell sections which are assembled end-to-end along the centerline 100. It will be appreciated that the deep drawing or the stamping operation utilized in the fabrication according to FIGS. 6A through 6E is suitable for high speed and low cost fabrication that utilizes simple tooling in the fabrication of the thin-walled outer shells. A wide variety of profiles or contours of the thin-walled outer shell pieces may be formed using the deep draw stamping process described hereinabove or other processes. Several profiles or contours for rollers or pulleys that may be formed are illustrated in FIGS. 16A through 16I to be described hereinbelow. Other examples of methods for forming the thin-walled outer shell include vacuum forming or even injection molding depending on the materials selected for the end use application of the low-mass roller. Other metallic materials suitable for fabricating the thin-walled outer shell include carbon steel, leaded steel, copper, brass or aluminum, to name a few examples. Non-metallic materials may be used, which may require different fabrication methods to provide thin-walled outer shells that may be joined together using processes other than welding or to provide shells which must be completely non-conductive, for example.

Referring now to FIG. 7, there is illustrated an exploded perspective view of the components of the thin-walled outer shell which include two of the thin-walled outer shell sections produced according to the operations described previously in conjunction with FIGS. 6A through 6E and a third component called a weld ring. In FIG. 7, a pair of thin-walled outer shell sections 110 are arranged along a centerline 114 on either side of a weld ring 112 also arranged coaxially with the centerline 114. The weld ring 112 may be fabricated of the same or similar material as the thin-walled outer shell sections 110 and must be weld- or braze-compatible with the material used in the outer shell sections. The weld ring 112, which may be produced by common machining methods, or by forging, stamping, casting or molding, serves multiple purposes in the fabrication of a thin-walled outer shell of the low-mass roller of the present disclosure. As will be apparent from the description which follows, the weld ring aligns the shell sections, supplies filler material for the welding, prevents burn-through during welding and provides a seat or ledge to fix the hollow polymer body portion of the low-mass roller in position within the outer shell portion.

The weld ring 112 has first and second side portions 124, 126 respectively. The cylindrical side portions 124, 126 may together resemble a circular band of thin material. This circular band portion has an outer diameter slightly less than the inside diameter of the facing open end of the thin-walled outer shell 110 so that the respective side 124 or 126 of the weld ring 112 may be nested within and yet remain in contact with the inside diameter of the corresponding open end 116 of the thin-walled outer shell 110. In FIG. 7, each of the first and second side portions 124 and 126 includes an edge 122 which is inserted into the corresponding open end 116 of the corresponding thin-walled outer shell 110. The inside diameter of the weld ring 112 is shown at reference number 130 in FIG. 7.

The weld ring 112 further includes a circumferential ring portion disposed around the circumference of the circular band portion of the weld ring 112 midway between the edges 122 of the side portions 124 and 126 of the weld ring 112. The circumferential ring portion in the illustration of FIG. 7 extends orthogonally outward from the outer surface of the circular band portion of the weld ring by a height given the value h. This value h is selected to be approximately 1.5 times greater than the thickness of the adjoining thin-walled outer shell. The weld ring 112 may be thought of in cross-section as an inverted T wherein the circumferential ring portion forms the vertical portion of the T and the circular band portion of the weld ring 112 forms the crossbar portion of the T. In some circumstances, such a weld ring is referred to informally as a "T-ring."

The weld ring 112 or "T-ring" solves a number of problems in the fabrication of the thin-walled outer shell of the low-mass roller or pulley of the present disclosure. For example, the weld ring serves to align the two halves of the thin-walled outer shell 110 so that the combination of the three components, the thin-walled outer shell 110 and the weld ring 112, are held in alignment along the same axis, the centerline 114. Thus the assembly, through the use of the weld ring, becomes self-aligning. Further, when welded, the weld ring provides a substantial increase in the strength of the thin-walled outer shell and acts somewhat like an I-beam contributing substantial stiffness to the thin-walled outer shell in the middle portion of the assembled shell. Other advantages of the weld ring will become apparent hereinbelow when its usefulness in the welding process is described in detail. In FIG. 7, each of the two thin-walled outer shell sections 110 is shown having a first respective end 116 which will be installed in overlapping relationship over the respective side portions 124, 126 of the weld ring 112. An opposite end 118 defines the opening at either end of the assembled low-mass roller. The interior 120 of each thin-walled outer shell section 110 will be described in detail later wherein the polymeric hollow body is formed within the completely formed thin-walled outer shell assembly. The inside diameter of the first respective end 116 of each thin-walled outer shell section is shown as reference number 117. It is this surface which slips over the outer diameter of the respective side portion 124 or 126 of the weld ring 112.

Referring now to FIG. 8, there is illustrated a cutaway perspective view of the center portion of an assembled outer shell which is assembled from two identical thin-walled outer shell sections 110 in a nested relationship with the weld ring 112. The first respective ends 116 of the thin-walled outer shell sections 110 are slipped over the corresponding sides 124, 126 of the weld ring 112 and butted up against the circumferential ring 128. It will be observed that the circumferential ring 128 extends above the outer diameter of the thin-walled outer shell section. In a typical outer shell assembly, this extension is approximately one-half the thickness of the thin-walled outer shell section. As will be described in detail hereinbelow in conjunction with FIG. 9, this protruding circumferential ring portion 128 of the weld ring 112 provides the extra material needed during welding to properly join and fill the joint formed between the two thin-walled outer shell sections 110. Also shown in FIG. 8 is the internal appearance of the weld ring 112 having the edge 122 inserted within the inside diameter 117 of the first respective end 116 of the thin-walled outer shell section 112. The self-aligning property of the combination of the weld ring and the thin-walled outer shells is readily apparent in FIG. 8 as is the strengthening effect of the weld ring structure provided to the thin-walled outer shell. As will be described, the welding energy is applied between the outer edge of the circumferential ring portion 128 of the weld ring 112 and the thin-walled outer shell such that the heat resulting from the weld energy is distributed through the weld ring. The cylindrical circular band portion (having the inside diameter 130) of the weld ring 112 prevents the arc conveying the weld energy from burning through the joint region during the welding process. The circumferential ring portion 128 provides the filler material needed to provide a relatively smooth weld in the joint region between the first respective ends 116 as shown in FIG. 7 of the thin-walled outer shell sections 110. As will be described further in conjunction with FIG. 10 below, the circular band portion 130 of the weld ring 112 also acts to retain the hollow polymeric body portion of the low-mass roller of the present disclosure from movement within and relative to the thin-walled outer shell.

Figure 9A:
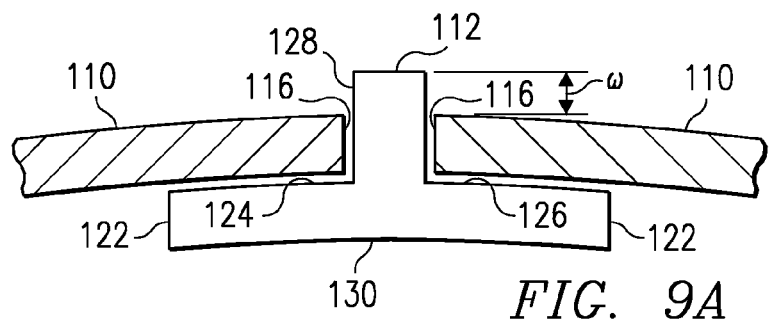
FIG. 9A illustrates an enlarged cross-section view of the cutaway center portion of the outer shell of FIG. 8 showing the nested relationship of the outer shell components and the weld ring.
Figure 9B:
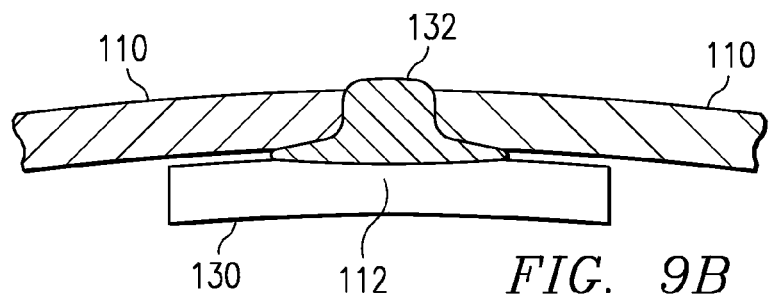
FIG. 9B illustrates the same components as in FIG. 9A but after the welding process has been completed.
Figure 9C:
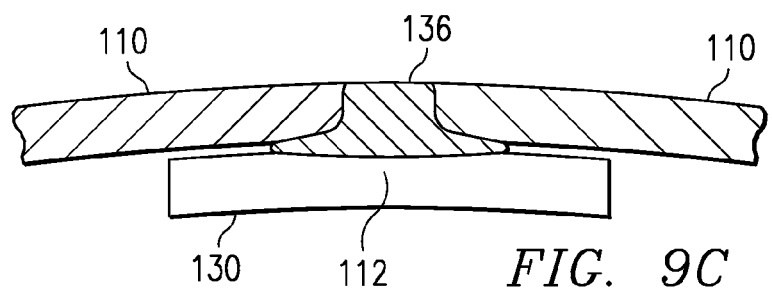
FIG. 9C illustrates the same view as FIG. 9B but after the grinding and polishing steps have been completed in the fabrication of the outer shell portion of the low-mass roller of the present disclosure.

Referring now to FIG. 9A, there is illustrated an enlarged cross-section view of the assembled center portion of the outer shell of FIG. 8 showing the nested relationship of the outer shell components 110 and the weld ring 112. The two thin-walled outer shell sections 110 are shown in an overlapping relationship with the band portion of the weld ring 112. The shell sections 110 and the weld ring 112 are shown in FIGS. 9A, 9B and 9C slightly separated in the drawing for clarity. In practice, the adjacent surfaces would be substantially in contact. The end portions 116 of the thin-walled outer shell sections 110 are butted against the circumferential ring portion 128 of the weld ring 112 when properly assembled. The weld ring 112 is shown in cross-section. This view includes a cross section of the circular band portion of the weld ring 112. Also shown are the parallel edges 122 of either side portion 124, 126 and the under side surface 130 which is the inside diameter surface of the weld ring 112. When the ends 116 of the thin-walled outer shell sections 110 are installed on the weld ring 112, the inside surface of the respective thin-walled outer shell section 110 overlaps and rests against the outside diameter surface of the circular band portion of the weld ring on one side 124 and on the opposite side 126. It will be observed that the circumferential ring portion 128 of the weld ring 112 extends above the outer surface of the thin-walled outer shell sections 110 by a distance identified by the value w. The value of w is an empirically determined distance which provides sufficient material to form a weld bead which protrudes slightly above the adjacent surfaces of the thin-walled outer shell sections 110. In this illustrative embodiment the value of w is approximately one-half the thickness of the material in the thin-walled outer shell sections 110.

Referring now to FIG. 9B, there are illustrated the same components shown in FIG. 9A but after the welding process has been completed. The welding may be accomplished by tungsten-inert gas (TIG) or plasma welding in the illustrated embodiment. Other suitable processes include brazing, soldering or adhesive bonding (glueing). During welding or brazing, the welding energy is applied to the upper portion 132 of the circumferential ring 128 which heats the metal of the weld ring 112 such that the welding action takes place in the weld ring 112 and adjacent parts of the thin-walled outer shell sections 110. The weld is shown in FIG. 9B as a cross-hatched area of the circumferential ring 128 shown at 132. The weld bead (the region where molten metal exists, i.e., is "wet") 132 generally is formed along a portion of the interface when the parts are being welded by TIG or electric arc processes. When the parts are being brazed or soldered, the "wet" portion extends throughout the interface surfaces where the shells 110 and the weld ring 112 are substantially in contact.

The use of the weld ring of a particular configuration described hereinabove has several advantages which, in addition to providing to relatively precise alignment between the outer shell sections 110 the weld ring 112 also tends to retain the heat of welding within the weld ring and the adjoining surfaces while resisting the tendency to penetrate through the region and blow through the area being welded. The weld ring 112 also provides the necessary filler material to compensate for the deformation of the relatively thin-walled materials being welded as well as lending strength to the welded assembly by providing an I beam-like structure completely around the circumference of the welded outer shell. Another advantage of the weld ring 112 is, since the circular band portion extends slightly into the interior portion of the outer shell, a seize point or ridge is provided to prevent movement of the hollow body inside the outer shell along the longitudinal axis and retains the hollow body portion in a fixed relationship with respect to the outer shell.

This construction of the thin-walled outer shell sections using a weld ring such as configured according to the illustration in FIGS. 9A, 9B and 9C has been found to be superior to more conventional methods of welding. For example, efforts to weld thin-walled tubular sections in a butt joint relationship without a weld ring such as the T-ring embodiment described herein generally results in deforming the outer shell components in the region of the weld and also tends to allow molten metal used in the welding to pass through the joint and drip to the interior portion of the outer shell. This loss of welding material to the interior of the outer shell during welding requires the addition of further welding material which tends to increase the size of the weld, increase the temperatures and exacerbate the problems of providing a smooth weld joint that can be easily ground and polished to a smooth profile. The loss of welding material to the interior of the outer shell also necessitates an additional operation in manufacturing to remove the excess material which impedes production and increases costs. The use of a weld ring also lends itself to an automated welding process because the factors which tend to contribute to a poor weld have been considered in the design of the weld ring used to join the two thin-walled outer shell sections together. Automating the weld process will be discussed further hereinbelow.

Referring now to FIG. 9C, there is illustrated the same view of the welded, thin-walled outer shell sections as shown in FIGS. 9A and 9B after the machining and polishing operations have been performed to reduce the exposed weld bead to the same surface profile as the adjoining outer surfaces of the thin-walled outer shell sections 110. Various machining operations including grinding or lathe cutting may be used to remove the weld bead. Electro-polishing or honing may also be used to provide the desired surface finish. This surface after machining or grinding is shown at 136 in FIG. 9C which is shown to have smoothed the surface of the weld bead 132 shown in FIG. 9B to the smooth profile 136 shown in FIG. 9C. This smooth profile, since it is formed from the same material used for both the weld ring 112 and the outer shell sections 110 provides a surface without any discontinuities which can be plated or otherwise finished wherein the welding process leaves minimal residue to interfere with the application of a desired finish. In the case of stainless steel materials used for the weld ring 112 and the thin-walled outer shell sections 110, in many applications no further processing is required to achieve a finish which is very durable and highly resistant to corrosion as well as being sufficiently thin-walled through the region of the weld to permit sterilization by irradiation processes. The thin wall construction maintained by the use of the weld ring configuration shown in FIGS. 9A, 9B and 9C thus maintains the advantages of the lightweight thin-walled outer shell construction even though the outer shell is constructed from more than one piece of metal.

Figure 9D:
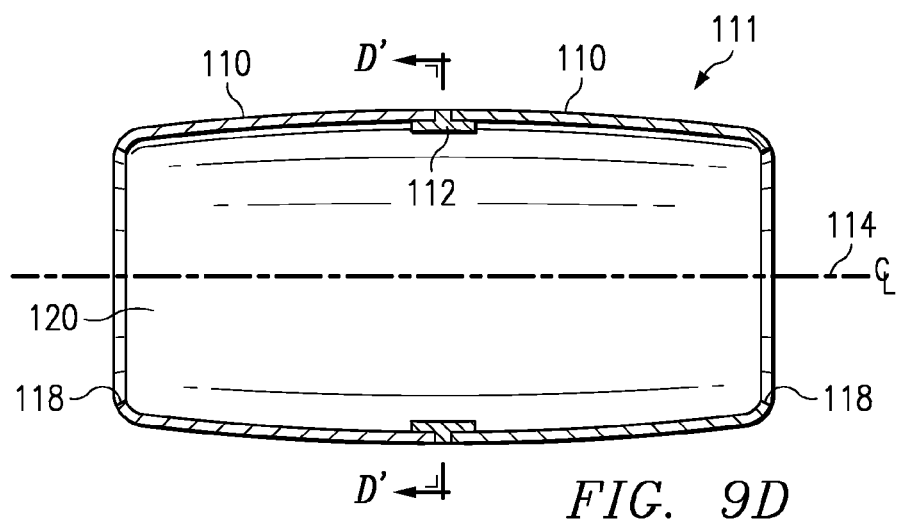
FIG. 9D illustrates a cross-section view taken along the centerline of an assembled, welded, ground and polished outer shell.

Referring now to FIG. 9D, there is illustrated a cross-section view taken along the centerline 114 of the assembled thin-walled outer shell 111 having open ends 118 at each end and an interior surface 120 which is ready for the next step in the fabrication of a low-mass roller. The open ends 118 may be formed to extend to a greater or lesser degree around the end of the outer shell into the end cross-section of the low-mass roller depending on the particular application. However, it will be observed that by having some extension into the plane of the end of the roller the thin-walled outer shell provides retention of the hollow body portion of the low-mass roller to be described hereinbelow. The amount of extension of the thin-walled outer shell around the ends of the low-mass roller can be controlled during the drawing process of forming the thin-walled outer shell sections as described hereinabove in conjunction with FIGS. 6D and 6E or by a separate forming operation. The open ends 118 at each end of the outer shell 111 must be formed in precise dimension and with precise alignment with the centerline 114 because the open ends 118, which may include the lip as described hereinabove, at each end serve to accurately position the outer shell sections 110 with respect to the one centerline 114 and the weld ring 112. To provide sufficient accuracy the diameter tolerance of the round opening at each open end 118 is plus or minus 0.001 inch in the preferred embodiment. Also, the concentricity of each opening at the open ends 118 should be plus or minus 0.002 inch, measured along the radius from the centerline 114 to the perimeter of the outer surface of the outer shell 111. In other words the openings at the open ends 118 must be the same diameter and centered on the same centerline 114. The centerline 114 thus becomes very important because it serves as the common reference for the various manufacturing processes used to assemble, weld, grind, polish or machine the parts of the low mass roller. Similarly, the dimensioning of the opening at the open ends 118 serves as the alignment guide for accurately positioning the shell sections and the weld ring during the welding operation.

For example, in an automated or partially automated manufacturing operation the outer shell sections 110 and the weld ring 112 are assembled on an arbor so that the three parts are held in alignment, properly centered. The arbor is secured in a chuck and rotated, as in a lathe, during the welding, grinding and polishing processes. During electric arc welding, the ground electrode is connected to the arbor, while the other electrode is positioned in close proximity (but not touching) to the outer portion of the weld ring 112.

Figure 10A:
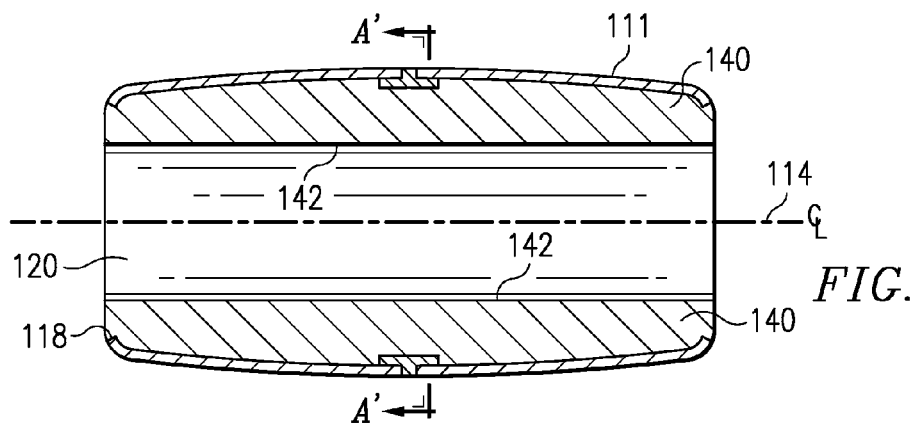
FIG. 10A illustrates a cross-section along the longitudinal centerline of one embodiment of the low-mass roller according to the present disclosure after the polymer body has been molded within the outer shell.

Referring now to FIG. 10A, there is illustrated a cross-section along the longitudinal centerline 114 of one embodiment of the low-mass roller according to the present disclosure after the polymer hollow body has been injection molded within the outer shell. FIG. 10A is much the same as FIG. 9D and the same reference numbers refer to the same structures in the two drawings. Further, the hollow polymer body 140 is shown as molded in situ within the interior surface of the thin-walled outer shell 111. The hollow polymer body 140 includes a cylindrical hollow space surrounding the centerline 114 for receiving an axle assembly upon which the low-mass roller of the present disclosure may rotate in a particular application. Molding processes using polymer materials such as thermoplastics are well understood in the art and will not be described further herein.

Continuing with FIG. 10A, it will be appreciated that a wide variety of polymer or thermoplastic materials may be utilized to form the hollow body portion 140 used in the low-mass roller or pulley of the present disclosure. In general, a material should be selected to provide both strength and lightweight of the hollow body and of the low-mass roller as well as the ability to withstand a wide variety of conditions involving temperature variation, vibration or mechanical shock. Such polymers may be solid, or resilient having various durometer values, depending on the application. Polymers may also be impregnated with other materials to provide other properties such as electrical conductivity or for acoustical quietness, etc. For example, a polymer body may have a quantity of carbon fibers distributed throughout its mass in order to provide sufficient electrical conductivity to drain away static charges which tend to build up on rollers in use in a wide variety of industrial applications. One example of a thermoplastic composite material which provides dissipation of electrostatic charge is the Stat-Kon® lines of materials available from LNP Engineering Plastics Inc. of Exton, Pa. Other rollers may be designed with polymer materials that are relatively inert acoustically or which absorb shock or sound energy such that the rollers in use remain quiet in the presence of the vibration and shocks that occur during normal operations using rollers of the type describer herein. Such inert materials may also be formed to provide non-resonant rollers which, unlike solid metal rollers, have a much diminished tendency to ring when struck or when operating in contact with belts or other items.

Figure 10B:
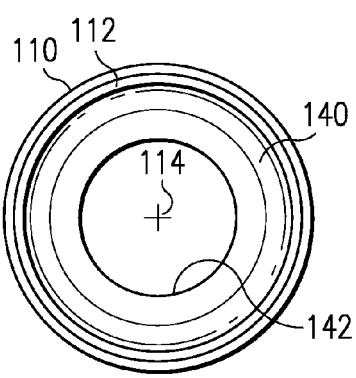
FIG. 10B illustrates a cross-section view of the low-mass roller outer shell of FIG. 10A taken at section A'—A'.
Figure 10C:
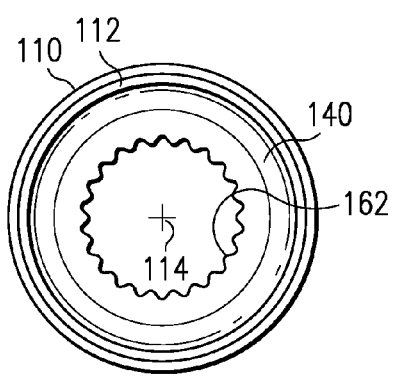
FIG. 10C illustrates the same view as in FIG. 10B wherein the inner diameter of the hollow body is shown splined for driven roller applications or for receiving a press fit bushing.

Referring now to FIG. 10B, there is illustrated a cross-section view of the low-mass roller of FIG. 10A taken at section A'—A' to show the cylindrical structure of the low-mass roller and the stiffening effect of the weld ring 112 which encircles the interior portion of the thin-walled outer shell 110 and acts also to retain the longitudinal movement of the hollow body portion 140 along the longitudinal axis or centerline 114. The hollow polymer body 140 includes the cylindrical space 142 for receiving an axle assembly. FIG. 10C is very similar to FIG. 10B except that it shows the interior surface 162 of the tubular space within the hollow polymer body 140 which has been splined in a longitudinal direction in order to prevent the rotation of an axial component installed within the tubular space. For example, if the low-mass roller is intended to be constructed with a cylindrical bushing as a bearing, that is, a bearing which is formed of a cylindrical surface in which an axle is inserted, then the bushing may be retained in a fixed, non-rotating relationship with the hollow polymer body 140 by the splines 162 formed in the interior tubular surface 162 of the hollow polymer body 140. In another similar example, the low-mass roller may be a driven roller which requires that the roller be installed in a fixed relationship with the axle itself. FIGS. 10B and 10C merely illustrate two of many possible ways the interior tubular space of the hollow polymer body 140 may be configured and are not intended to be limiting. However, several other configurations will be discussed hereinbelow in conjunction with FIG. 14.

Figure 11A:
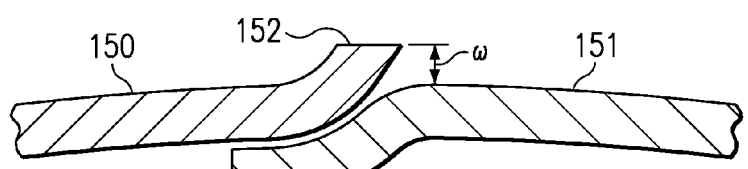
FIG. 11A illustrates a cross-section view of an alternate embodiment of the joint region of the outer shell for a low-mass roller having an integral weld ring structure formed into the ends of the thin-walled tubing sections to be joined together.
Figure 11B:
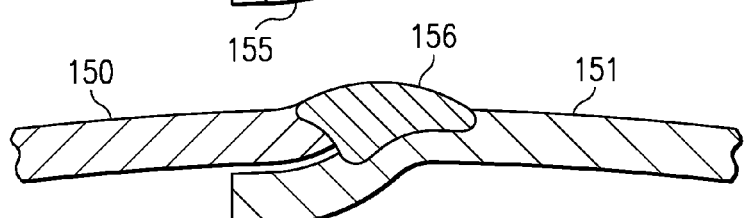
FIG. 11B illustrates the view of FIG. 11A after the welding process.
Figure 11C:
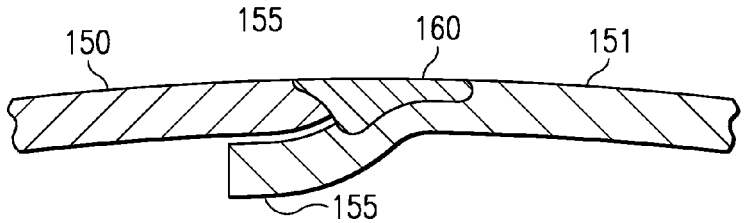
FIG. 11C illustrates the view of FIGS. 11A and 11B following the grinding and polishing steps.

Referring now to FIGS. 11A, 11B and 11C, there are illustrated enlarged cross-section views of the cutaway center portion of the outer shell of FIG. 8 showing an alternate embodiment of a nested relationship of the thin-walled outer shell components which are formed to approximate the function of a weld ring. This alternate embodiment provides for a lower cost fabrication of the outer shell. It will be noted that FIGS. 11A, 11B and 11C are drawn to show approximately the same stages of the joining and welding processes as are illustrated in FIGS. 9A, 9B and 9C for the previous embodiment. In FIG. 11A, the cross-section shows the open ends of the thin-walled outer shell sections 150, 151 which are formed to fit together in a nesting relationship which provides the alignment of the thin-walled outer shell sections necessary during the welding process. It will be seen in FIG. 11A that the upturned portion of the end of one of the thin-walled outer shell sections 150 at 152 serves to provide the weld material in the manner of the circumferential ring portion 128 which extends beyond the outer surface of the assembled thin-walled outer shell section as shown previously in FIG. 9A. Similarly, the open end 154 of the thin-walled outer shell section 151 shown in FIG. 11A has been formed to be inserted within the open end of the thin-walled outer shell section 150 as shown in FIG. 11A. The formed portion 155 of FIG. 11A provides an integral backup ring behind the area being welded so that the welding heat remains within the joint area and prevents the penetration of the arc energy from welding into the space inside of the assembled thin-walled outer shell sections. As in FIG. 9A, the welding energy is supplied to the upturned portion 152 of the thin-walled outer shell section 150 which provides the material during welding. This upturned portion 152 supplies material sufficient to fill the slight deformation of the outer shell sections in the vicinity of the weld that may result from the heat energy of the welding process so that the result is a uniform bead 156 across the region of the weld as shown in FIG. 11B. Also shown in FIG. 11B is the internal portion of the weld shown as a cross-hatched area which occurs in the thin-walled outer shells 150 and 151 as shown in FIG. 11B. FIG. 11C shows the thin-walled outer shell sections 150 and 151 joined by welding after the welding and the machining or grinding and polishing processes have been completed resulting in a smooth profile as shown at 160 in FIG. 11C. It will be appreciated by those skilled in the art that the methods for forming the open ends 152 and 154 of the thin-walled outer shell sections 150 and 151 are well known and will not be described in detail further herein. Typically the forming of the open ends 152 and 154 occurs as part of the fabrication of the outer shell sections as described in conjunction with FIG. 6 hereinabove.

Figure 12:
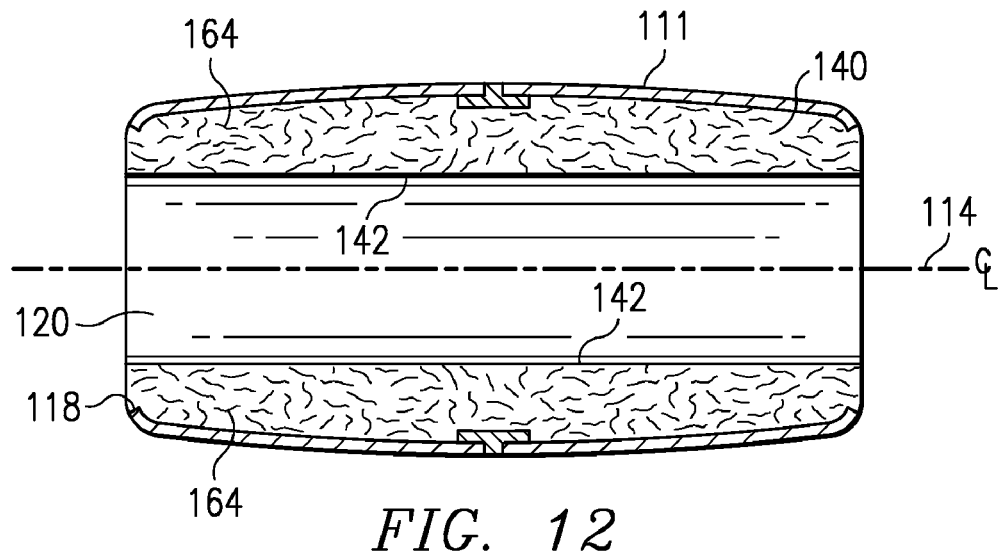
FIG. 12 illustrates the embodiment of FIG. 10A wherein the molded hollow body polymeric material is filled with conductive fibers to provide electrical conductivity.

Referring now to FIG. 12, there is illustrated an alternate embodiment of a low-mass roller very similar to the one shown in 10A with the exception that the material used for the hollow polymer body 140 includes a distribution of carbon fibers 164. This additive material, as previously described, provides sufficient electrical conductivity to drain away accumulating static charges during the operation of the low-mass roller in its end-use equipment. The impregnated material 164 shown in FIG. 12 may also represent a mixture of other materials within the material of the hollow polymer body in order to provide certain other prescribed properties needed in a particular application of the low-mass roller. Other materials typically used to provide electrical conductivity include steel fibers, aluminum flakes, carbon powder or other fibers to provide reinforcement or to act as fillers.

Figure 13:
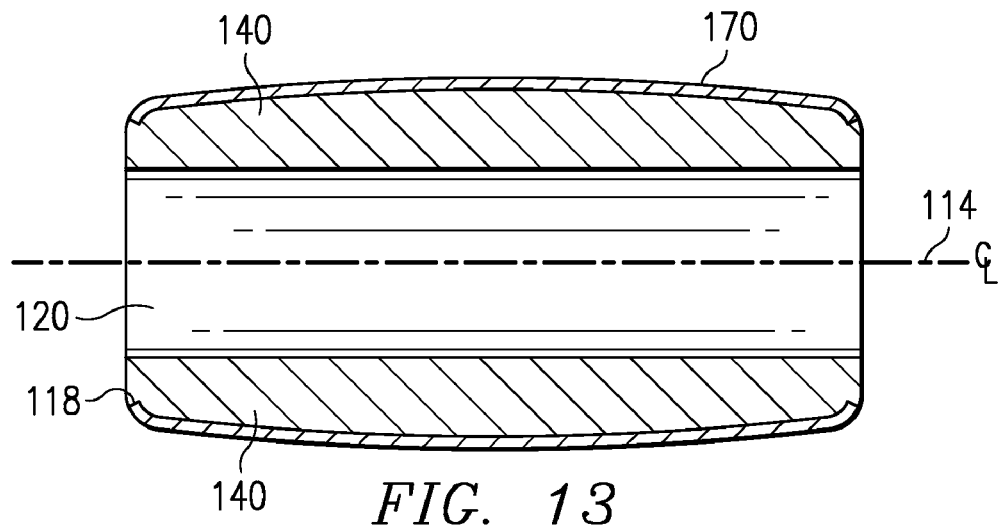
FIG. 13 illustrates an embodiment similar to the embodiment shown in FIG. 10A wherein the outer shell is formed without using a weld ring.

Referring now to FIG. 13, there is illustrated another embodiment of a completed low-mass roller which is formed from a unitary thin-walled outer shell and the molded hollow polymer body as previously described. While presently more expensive to manufacture than the assembly of two thin-walled outer shell sections using the weld ring described hereinabove, it is possible and may be preferable in certain applications to provide a thin-walled outer shell fabricated in a single piece of metal. This is shown at 170 in FIG. 13 along with a hollow polymer body 140 as previously described.

Figure 14:
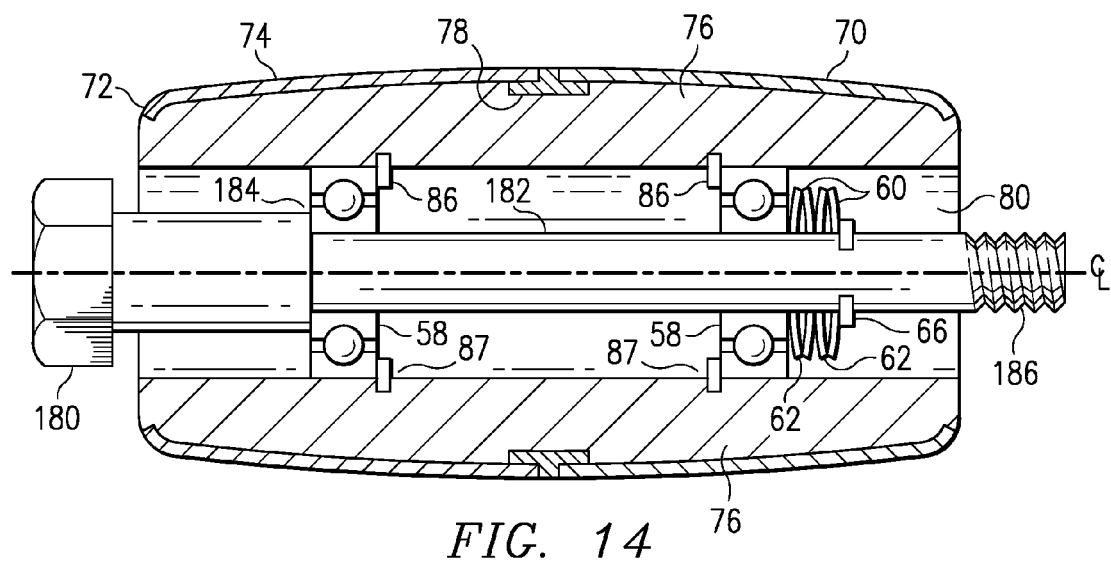
FIG. 14 illustrates a low-mass lower or pulley according to the present disclosure mounted upon an axle bolt for assembly into associated equipment.

Referring now to FIG. 14, there is illustrated a low-mass roller according to the present disclosure which has been fabricated from thin-walled stainless steel and thermoplastic material according to the methods described using a weld ring and which has been illustratively assembled with an axle bolt for assembly into a particular kind of machinery. The axle bolt 180 is shown as an illustrative example of one kind of axle assembly and is not intended to be limiting in that respect. In FIG. 14, the assembled thin-walled outer shell 74 is shown constructed using the weld ring 78 and into which has been molded the hollow polymer body 76 having an interior tubular space 80 for receiving an axle assembly as shown in the Figure. FIG. 14 is very similar to FIG. 5 in that it uses ball bearing assemblies such as electric motor bearings to support the low-mass roller on the axle bolt 180. It will be seen that the bearings are retained in position by retaining rings 86 which are installed in grooves milled in the interior surface of the tubular space of the hollow body 76 at locations 87. The outer race of the bearings 58 rest against the outer side of the retaining rings 86. The axle portion 182 of the axle bolt 180 passes through the inner race of the bearings 58 at both locations. A shoulder machined into the axle bolt 180 at a prescribed distance from the head of the bolt 180 provides a thrust surface for the bearing 58 shown at the left end of the drawing. The axle bolt 180 is retained at the opposite end of the low-mass roller by two pairs of disk springs or conical washers 60 shown disposed between the inner race of the right hand bearing 58 and a retaining ring 66 which is snapped into a groove machined into the axle shaft 182 of the axle bolt 180 near the right hand end of the low mass assembly as shown in FIG. 14. As is well known in the art, such retaining rings 66 or 86 are C-shaped rings made of spring steel which may be spread to pass over a shaft diameter and, when the spread is released, the ring settles into the groove provided for it. The head of the axle bolt may be recessed within the tubular space of the hollow body of the low-mass roller, configured with other head shapes such as a hex socket machined in the end of the axle shaft. In some applications a dust cap or other seal may be provided at either or both ends to keep dust and moisture out of the bearing area. The end of the axle bolt 180 which extends to the right in the Figure from the end of the low-mass roller may be threaded as shown at 186 or configured with other features to attach the low-mass roller assembly to the equipment in which the roller is being used.

The application shown in FIG. 14 is intended to be illustrative only and not limiting in terms of the kinds of axle assemblies or constituent components which may be used with the low-mass roller of the present disclosure. It will be appreciated by a person skilled in the art that many different kinds of bearing assemblies and axle assemblies may be utilized. It is possible for other kinds of mechanical assemblies such as clutches, planetary gear sets, ratcheting mechanisms or braking mechanisms may be installed within the hollow interior space of the hollow polymer body portion of the low-mass roller of the present disclosure. The interior surface of the hollow body may be machined as desired to accommodate a particular assembly or may also be splined as previously described or provided with a key way so that it may be installed on a keyed shaft in applications where the roller is to be a driven roller and the like. It will also be appreciated that the loading upon bearing assemblies may be applied either on both ends of the axle portion within the low-mass roller such as shown in FIG. 5 wherein the bearing assemblies are center loaded or the bearing assemblies may be end loaded as shown in FIG. 14 wherein the conical washer assemblies are placed against one bearing, again dependent upon the particular application that the low-mass roller is being provided to fulfill.

Figure 15:
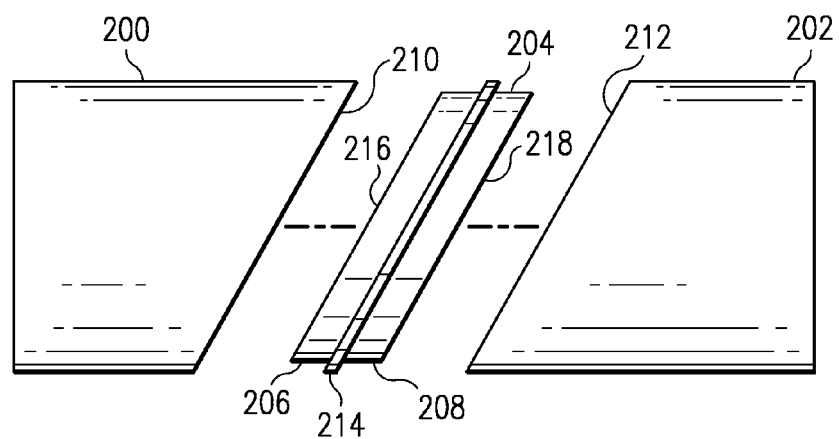
FIG. 15 illustrates an alternate embodiment of the present disclosure for joining two thin-walled tubing sections at an oblique angle.

Referring now to FIG. 15, there is illustrated a simplified view of an alternate embodiment of the present disclosure wherein two thin-walled tubes are prepared to be joined at an oblique angle using a weld ring of the present disclosure. There may be some applications wherein joining thin-walled tubing sections together for applications other than low-mass rollers is required. Such joints may be made at right angles as described hereinabove or may be made at oblique angles as illustrated in FIG. 15. Shown in FIG. 15 are a first thin-walled tubing section 200, and a second thin-walled tubing section 202 and a weld ring 204 having a first side 206 and a second side 208. The first and second sides 204, 206 together represent a thin-walled band portion of tubing material having the same cross-section and cut at the same oblique angle as the first and second thin-walled tubing sections 200, 202. Further, the outer diameter dimension of the weld ring band sides 206, 208 is sized to just fit within the inside diameter dimension of the proximate first end 210 and the proximate second end 212 respectively of the first and second thin-walled tubing sections 200, 202 is a nesting relationship therewithin. The weld ring 204 includes a circumferential ring portion 214 extending outward from and disposed around the outer surface of the of the first and second sides 206, 208 of the weld ring band portion. The circumferential ring portion 214 of the weld ring 204 is disposed parallel to the edges, 216, 218 of the first and second sides 206, 208 of the band portion of the weld ring 204 and extends to a distance of approximately 1.5 times the thickness of the first and second thin-walled tubing sections 200, 202 being joined. The selection of material, assembly, welding of this alternate embodiment is performed as described hereinabove for FIGS. 7, 8 and 9A–9E and will not be described further herein.

Referring now to FIGS. 16A through 16I there are illustrated several variations in the profile or contour of rollers or pulleys that maybe fabricated according to the processes disclosed herein. The straight profile roller of FIG. 16A and the crowned profile roller of FIG. 16B have already been described. A variation of the crowned roller is shown in FIG. 16C wherein the mid-portion of the roller has a straight profile while the end portions are tapered toward the ends of the roller with a decreasing radius. FIG. 16D is a variation having both ends tapered as in FIG. 16C but with no straight profile portion between the tapered portions. FIG. 16E illustrates the inverse profile of FIG. 16D wherein the tapered portions are characterized by an increasing radius toward the ends. FIG. 16F illustrates an inverse of the crowned profile of FIG. 16B wherein the roller diameter is larger at the ends than in between the ends. FIGS. 16G, 16H and 16I illustrate pulleys having reduced diameters between larger outer diameters having tapered, step-wise or rounded profiles on either side of the reduced diameter portion respectively. These examples shown in FIGS. 16A through 16I are intended to be illustrative and not limiting. Many other profiles or contours are of course feasible as will be apparent to persons skilled in the art.

Although the preferred embodiment has been described in detail, it should be understood that various changes, substitutions and alterations can be made therein without departing from the spirit and scope of the invention as defined by the appended claims. The low-mass roller of the present disclosure may find application in many types of machines in numerous industrial uses including automotive, business machines, manufacturing operations and others requiring flat belt pulleys, idler pulleys, rollers for mail sorting and extracting equipment, conveyors and the like.

What is claimed is:

1. A low-mass roller, comprising:
   a cylindrical body having an exterior surface, first and second open ends and defining an interior tubular space along a longitudinal axis therethrough for receiving an axle therein, said cylindrical body formed of polymeric material said cylindrical body having a diameter at said first and second ends that is smaller than a diameter thereof at at least one intermediate location along the longitudinal axis thereof with at least a portion of the exterior surface from the first end to the intermediate location and the second end to the intermediate location has a positive slope with respect to the longitudinal axis; and
   an outer shell formed of metal proximately and conformally covering said exterior surface of and having a formed circular opening surrounding each said first and second ends of said cylindrical body, wherein said cylindrical body, said outer shell and said circular openings are concentric with said longitudinal axis, said outer shell disposed about said cylindrical body after formation of said cylindrical body;
   wherein said outer shell comprises an assembly of first and second thin-walled tubular shells having inside diameters, at first respective ends thereof, equal within a predetermined tolerance wherein said first respective ends are joined together and welded;
   wherein said assembly further comprises a weld ring having an outside diameter smaller than said inside diameters of each said first respective end of said first and second thin-walled tubular shells by a predetermined value, said weld ring disposed between and nested within said first respective ends of first and second thin-walled tubular shells such that said shells are held in alignment during said welding.

2. The low-mass roller of claim 1, wherein each said first and second tubular shells includes a second respective end opposite said first respective end such that an inward-extending lip formed in each said second respective end of said first and second tubular shells defines a circular alignment opening.

3. The low-mass roller of claim 2, wherein each circular alignment opening defines a predetermined radius from said longitudinal axis.

4. The low-mass roller of claim 3, wherein said weld ring further comprises:
   a circular band having said outside diameter and having a circumferential ring disposed around said outside diameter of said circular band, said ring extending orthogonally from said band by a height greater by a predetermined distance than the thickness of said thin metal of said first and second thin-walled tubular shells.

5. The low-mass roller of claim 2, further comprising:
   a circular band formed of the same thin metal as said first and second thin-walled tubular shells.

6. The low-mass roller of claim 1, wherein said outer shell comprises:
   an assembly of first and second thin-walled tubular shells having inside diameters, at first respective ends thereof, equal within a predetermined tolerance wherein said first respective ends are joined together and welded; and
   a weld ring having an outside diameter smaller than said inside diameters of each said first respective end of said first and second thin-walled tubular shells by a predetermined value, said weld ring disposed between and nested within said first respective ends of first and second thin-walled tubular shells such that said shells are held in alignment.

7. The low-mass roller of claim 4, wherein said circular band is formed of the same thin metal as said first and second thin-walled tubular shells.

8. The low-mass roller of claim 1, wherein said outer shell is formed by an assembly of drawn first and second thin-walled tubular shells having inside diameters, at first respective ends thereof, equal within a predetermined tolerance wherein said first respective ends are joined together and welded.

9. The low-mass roller of claim 8, wherein said assembly further comprises:
   a weld ring having an outside diameter smaller than said inside diameters of each said first respective end of said first and second thin-walled tubular shells by a predetermined value, said weld ring disposed between and nested within said first respective ends of first and second thin-walled tubular shells such that said shells are held in alignment during said welding.

10. The low-mass roller of claim 9, wherein said weld ring further comprises:
a circular band having said outside diameter and having a circumferential ring disposed around said outside diameter of said circular and, said ring extending orthogonally from said circular band by a height greater by a predetermined distance than the thickness of said thin metal of said first and second thin-walled tubular shells.

11. The low-mass roller of claims 9, wherein said weld ring further comprises:
a circular band formed of the same thin metal as said first and second thin-walled tubular shells.

12. The low-mass roller of claim 1, wherein said outer shell is formed by an assembly of stamped first and second thin-walled tubular shells having inside diameters, at first respective ends thereof, equal within a predetermined tolerance wherein said first respective ends are joined together and welded.

13. The low-mass roller of claim 12, wherein said assembly further comprises:
a weld ring having an outside diameter smaller than said inside diameters of each said first respective end of said first and second thin-walled tubular shells by a predetermined value, said weld ring disposed between and nested within said first respective ends of first and second thin-walled tubular shells such that said shells are held alignment during said welding.

14. The low-mass roller of claim 13, wherein said weld ring further comprises:
a circular band having said outside diameter and, having a circumferential ring disposed around said outside diameter of said circular band, said ring extending orthogonally from said band by a height greater by a predetermined distance than the thickness of said thin metal of said first and second thin-walled tubular shells.

15. The low-mass-roller of claim 13, wherein said weld ring further comprises:
a circular band formed of the same thin metal as said first and second thin-walled tubular shells.

16. The low-mass roller of claim 1, wherein said outer shell conforms to a crowned outline in longitudinal cross-section defined by a first outer diameter of said first and second open ends that is less than a second outer diameter located approximately midway between said first and second open ends.

17. The low-mass roller of claim 1 wherein said cylindrical body has a wall thickness substantially thicker than said metal of said outer shell.

18. The low-mass roller of claim 1, wherein said polymeric material is electrically non-conductive.

19. The low-mass roller of claim 1, wherein said polymeric material is electrically conductive.

20. The low-mass roller of claim 1, wherein said polymeric material is an acoustic absorber.

21. The low-mass roller of claim 1, wherein said polymeric material is acoustically inert.

22. A low-mass roller, comprising:
first and second tubular shells formed of a thin metal and having substantially equal inside diameters at first respective ends thereof, said first respective ends of said first and second tubular shells joined in nested relationship over each side of a weld ring disposed between said first respective ends and welded thereto to form a single cylindrical outer shell of said low-mass roller, said outer shell defining a longitudinal axis therethrough;
a continuous body, molded of polymeric material in situ within said outer shell, defining a tubular space therethrough for receiving an axle therewithin and along said longitudinal axids;
wherein each said first and second tubular shell includes a respective second end opposite said first respective end such that an inward-extending lip formed in each said second respective end of said first and second tubular shells defines a circular alignment opening with at least a portion of the interior surface of each said first and second tubular shell having a positive slope from said second end to said first end with respect to the longitudinal axis; and
said first and second tubular shells are assembled after formation of said continuous body.

23. The low-mass roller of claim 22, wherein said weld ring is formed of said thin metal and having a outside diameter dimensioned to allow said nesting of said weld ring within each said first respective end of said first and second tubular shells such that said first and second tubular shells are held in alignment during welding.

24. The low-mass roller of claim 23, wherein said weld ring further comprises:
a circular band having said outside diameter and further including a circumferential ring disposed around said outside diameter of said circular band, said circumferential ring extending orthogonally from said band by a height greater by a predetermined distance than the thickness of said thin metal of said first and second thin-walled tubular shells.

25. The low-mass roller of claim 23, wherein said weld ring comprises a circular band formed of said thin metal.

26. The low-mass roller of claim 22, wherein each circular alignment opening defines a predetermined radius from said longitudinal axis.

27. The low-mass roller of claim 22, wherein said outer shell conforms to a crowned profile in any plane cross-section containing said longitudinal axis, said crowned profile defined by a first outer diameter of said outer shell proximate to said weld ring and a smaller second outer diameter of said outer shell at second respective ends of said outer shell distant from said weld ring.

28. The low-mass roller of claim 22, wherein said outer shell has a wall thickness less than or equal to one-twentieth part of said inside diameter.

29. The low-mass roller of claim 22, wherein said first and second tubular shells are formed of stainless steel.

30. The low-mass roller of claim 22, wherein said first and second tubular shells are substantially identical half-shells each having a cylindrical cross-section and a first inside diameter at said first respective end and a second inside diameter at a second end thereof smaller than said first inside diameter.

31. The low-mass roller of claim 22, wherein said continuous body molded in situ within said outer shell has a wall thickness substantially thicker than said thin metal of said outer shell.

32. The low-mass roller of claim 22, wherein said polymeric material is electrically non-conductive.

33. The low-mass roller of claim 22, wherein said polymeric material is electrically conductive.

34. The low-mass roller of claim 22, wherein said polymeric material is acoustically non-resonant.

35. A low-mass roller, comprising:

first and second tubular shells formed of a thin metal and having substantially equal inside diameters at first respective ends thereof;

a weld ring formed of said thin metal and having an outer diameter dimensioned to allow nesting of a portion of said weld ring within each said first respective end of said first and second tubular shells when said shells are assembled on and welded to said weld ring to form a single cylindrical outer shell of said low-mass roller, said outer shell defining a longitudinal axis therethrough; and a continuous body defining a tubular space for receiving an axle along said longitudinal axis, said continuous body molded of a polymeric material in situ within said outer shell and substantially conformal therewith, and having and outer diameter that increases from the distal end inward and having on at least a portion of the exterior surface thereof a positive slope with respect to the longitudinal axis.

36. A low-mass roller, comprising:

a cylindrical body having an exterior surface, first and second open ends and defining an interior tubular space along a longitudinal axis therethrough for receiving an axle therein, said cylindrical body formed of polymeric material cylindrical body having a diameter at said first and second ends that is smaller than a diameter thereof at at least one intermediate location along the longitudinal axis thereof with at least a portion of the exterior surface from the first end to the intermediate location and the second end to the intermediate location has a positive slope with respect to the longitudinal axis; and an outer shell formed of metal proximately and conformally covering said exterior surface of and having a formed circular opening surrounding each said first and second ends of said cylindrical body, wherein said cylindrical body, said outer shell and said circular openings are concentric with said longitudinal axis, said outer shell disposed about said cylindrical body after formation of said cylindrical body;

wherein the outer shell further comprises an assembly of first and second thin-walled tubular shells having inside diameters, at first respective ends thereof, equal within a predetermined tolerance wherein said first respective ends are joined together and welded;

wherein said assembly further comprises a weld ring having an outside diameter smaller than said inside diameters of each said first respective end of said first and second thin-walled tubular shells by a predetermined value, said weld ring disposed between and nested within said first respective ends of first and second thin-walled tubular shells such that said shells are held in alignment during said welding;

wherein said weld ring further comprises a circular band having said outside diameter and having a circumferential ring disposed around said outside diameter of said circular band, said ring extending orthogonally from said band by a height greater by a predetermined distance than the thickness of said thin metal of said first and second thin-walled tubular shells.

37. A low-mass roller, comprising:

a cylindrical body having an exterior surface, first and second open ends and defining an interior tubular space along a longitudinal axis therethrough for receiving an axle therein, said cylindrical body formed of polymeric material said cylindrical body having a diameter at said first and second ends that is smaller than a diameter thereof at least one intermediate location along the longitudinal axis thereof with at least a portion of the exterior surface from the first end to the intermediate location and the second end to the intermediate location has a positive slope with respect to the longitudinal axis; and an outer shell formed of metal proximately and conformally covering said exterior surface of and having a formed circular opening surrounding each said first and second ends of said cylindrical body, wherein said cylindrical body, said outer shell and said circular openings are concentric with said longitudinal axis, said outer shell disposed about said cylindrical body after formation of said cylindrical body;

wherein said outer shell further comprises an assembly of first and second thin-walled tubular shells having inside diameters, at first respective ends thereof, equal within a predetermined tolerance wherein said first respective ends are joined together and welded;

wherein said outer shell further comprises a weld ring having an outside diameter smaller than said inside diameters of each said first respective end of said first and second thin-walled tubular shells by a predetermined value, said weld ring disposed between and nested within said first respective ends of first and second thin-walled tubular shells such that said shells are held in alignment.

38. A low-mass roller, comprising:

a cylindrical body having an exterior surface, first and second open ends and defining an interior tubular space along a longitudinal axis therethrough for receiving an axle therein, said cylindrical body formed of polymeric material said cylindrical body having a diameter at said first and second ends that is smaller than a diameter thereof at least one intermediate location along the longitudinal axis thereof with at least a portion of the exterior surface from the first end to the intermediate location and the second end to the intermediate location has a positive slope with respect to the longitudinal axis; and an outer shell formed of metal proximately and conformally covering said exterior surface of and having a formed circular opening surrounding each said first and second ends of said cylindrical body, wherein said cylindrical body, said outer shell and said circular openings are concentric with said longitudinal axis, said outer shell disposed about said cylindrical body after formation of said cylindrical body;

wherein the outer shell further comprises an assembly of first and second thin-walled tubular shells having inside diameters, at first respective ends thereof, equal within a predetermined tolerance wherein said first respective ends are joined together and welded;

wherein said assembly further comprises a weld ring having an outside diameter smaller than said inside diameters of each said first respective and of said first and second thin-walled tubular shells by a predetermined value, said weld ring disposed between and nested within said first respective ends of first and second thin-walled tubular shells such that said shells are held in alignment during said welding;

wherein said weld ring further comprises a circular band having said outside diameter and having a circumferential ring disposed around said outside diameter of said circular band, said ring extending orthogonally from said band by a height greater by a predetermined distance than the thickness of said thin metal of said first and second thin-walled tubular shells;

wherein said circular band is formed of the same thin metal as said first and second thin-walled tubular shells.

39. A low-mass roller, comprising:

a cylindrical body having an exterior surface, first and second open ends and defining an interior tubular space along a longitudinal axis therethrough for receiving an axle therein, said cylindrical body formed of polymeric material said cylindrical body having a diameter at said first and second ends that is smaller than a diameter thereof at least one intermediate location along the longitudinal axis thereof with at least a portion of the exterior surface from the first end to the intermediate location and the second end to the intermediate location has a positive slope with respect to the longitudinal axis; and an outer shell formed of metal proximately and conformally covering said exterior surface of and having a formed circular opening surrounding each said first and second ends of said cylindrical body, wherein said cylindrical body, said outer shell and said circular openings are concentric with said longitudinal axis, said outer shell disposed about said cylindrical body after formation of said cylindrical body wherein said outer shell is formed by an assembly of drawn first and second thin-walled tubular shells having inside diameters, at first respective ends thereof, equal within a predetermined tolerance wherein said first respective ends are joined together and welded;

wherein said assembly further comprises a weld ring having an outside diameter smaller than said inside diameters of each said first respective end of said first and second thin-walled tubular shells by a predetermined value, said weld ring disposed between and nested within said first respective ends of first and second thin-walled tubular shells such that said shells are held in alignment during said welding.

40. A low-mass roller, comprising;

a cylindrical body having an exterior surface, first and second open ends and defining an interior tubular space along a longitudinal axis therethrough for receiving an axle therein, said cylindrical body formed of polymeric material said cylindrical body having a diameter at said first and second ends that is smaller than a diameter thereof at least one intermediate location along the longitudinal axis thereof with at least a portion of the exterior surface from the first end to the intermediate location and the second end to the intermediate location has a positive slope with respect to the longitudinal axis; and an outer shell formed of metal proximately and conformally covering said exterior surface of and having a formed circular opening surrounding each said first and second ends of said cylindrical body, wherein said cylindrical body, said outer shell and said circular openings are concentric with said longitudinal axis, said outer shell disposed about said cylindrical body after formation of said cylindrical body wherein said outer shell is formed by an assembly of drawn first and second thin-walled tubular shells having inside diameters, at first respective ends thereof, equal within a predetermined tolerance wherein said first respective ends we joined together and welded;

wherein said assembly further comprises a weld ring having an outside diameter smaller than said inside diameters of each said first respective end of said first and second thin-walled tubular shells by a predetermined value, said weld ring disposed between and nested within said first respective ends of first and second thin-walled tubular shells such that said shells are held in alignment during said welding;

wherein said weld ring further comprises a circular band having said outside diameter and having a circumferential ring disposed around said outside diameter of said circular band, said ring extending orthogonally from said band by a height greater by a predetermined distance than the thickness of said thin metal of said first and second thin-walled tubular shells.

41. A low-mass roller, comprising:

a cylindrical body having an exterior surface, first and second open ends and defining an interior tubular space along a longitudinal axis therethrough for receiving an axle therein, said cylindrical body formed of polymeric material said cylindrical body having a diameter at said first and second ends that is smaller than a diameter thereof at least one intermediate location along the longitudinal axis thereof with at least a portion of the exterior surface from the first end to the intermediate location and the second end to the intermediate location has a positive slope with respect to the longitudinal axis and an outer shell formed of metal proximately and conformally covering said exterior surface of and having a formed circular opening surrounding each said first and second ends of said cylindrical body, wherein said cylindrical body, said outer shell and said circular openings are concentric with said longitudinal axis, said outer shell disposed about said cylindrical body after formation of said cylindrical body wherein said outer shell is formed by an assembly of drawn first and second thin-walled tubular shells having inside diameters, at first respective ends thereof, equal within a predetermined tolerance wherein said first respective ends are joined together and welded;

wherein said assembly further comprises a weld ring having an outside diameter smaller than said inside diameters of each said first respective end of said first and second thin-walled tubular shells by a predetermined value, said weld ring disposed between and nested within said first respective ends of first and second thin-walled tubular shells such that said shells are held in alignment during said welding;

wherein said weld ring further comprises a circular band formed of the same thin metal as said first and second thin-walled tubular shells.

42. A low-mass roller, comprising:

a cylindrical body having an exterior surface, first and second open ends and defining an interior tubular space along a longitudinal axis therethrough for receiving an axle therein, said cylindrical body formed of polymeric material said cylindrical body having a diameter at said first and second ends that is smaller than a diameter thereof at least one intermediate location along the longitudinal axis thereof with at least a portion of the exterior surface from the first end to the intermediate location and the second end to the intermediate location has a positive slope with respect to the longitudinal axis; and an outer shell formed of metal proximately and conformally covering said exterior surface of and having a formed circular opening surrounding each said first and second ends of said cylindrical body, wherein said cylindrical body, said outer shell and said circular openings are concentric with said longitudinal axis, said outer shell disposed about said cylindrical body after formation of said cylindrical body;

wherein said outer shell is formed by an assembly of stamped first and second thin-walled tubular shells having inside diameters, at first respective ends thereof, equal within a predetermined tolerance wherein said first respective ends are joined together and welded;

wherein said assembly further comprises a weld ring having an outside diameter smaller than said inside diameters of each said first respective end of said first and second thin-walled tubular shells by a predetermined value, said weld ring disposed between and nested within said first respective ends of first and second thin-walled tubular shells such that said shells are held in alignment during said welding.

43. A low-mass roller, comprising:

a cylindrical body having an exterior surface, first and second open ends and defining an interior tubular space along a longitudinal axis therethrough for receiving an axle therein, said cylindrical body formed of polymeric material said cylindrical body having a diameter at said first and second ends that is smaller than a diameter thereof at least one intermediate location along the longitudinal axis thereof with at least a portion of the exterior surface from the first end to the intermediate location and the second end to the intermediate location has a positive slope with respect to the longitudinal axis; and an outer shell formed of metal proximately and conformally covering said exterior surface of and having a formed circular opening surrounding each said first and second ends of said cylindrical body, wherein said cylindrical body, said outer shell and said circular openings are concentric with said longitudinal axis, said outer shell disposed about said cylindrical body after formation of said cylindrical body;

wherein said outer shell is formed by an assembly of stamped first and second thin-walled tubular shells having inside diameters, at first respective ends thereof, equal within a predetermined tolerance wherein said first respective ends are joined together and welded;

wherein said assembly further comprises weld ring having an outside diameter smaller than said inside diameters of each said first respective end of said first and second thin-walled tubular shells by a predetermined value, said weld ring disposed between and nested within said first respective ends of first and second thin-walled tubular shells such that said shells are held in alignment during said welding;

wherein said weld ring further comprises a circular band having said outside diameter and having a circumferential ring disposed around said outside diameter of said circular band, said ring extending orthogonally from said band by a height greater by a predetermined distance than the thickness of said thin metal of said first and second thin-walled tubular shells.

44. A low-mass roller, comprising;

a cylindrical body having an exterior surface, first and second open ends and defining an interior tubular space along a longitudinal axis therethrough for receiving an axle therein, said cylindrical body formed of polymeric material said cylindrical body having a diameter at said first and second ends that is smaller than a diameter thereof at least one intermediate location along the longitudinal axis thereof with at least a portion of the exterior surface from the first end to the intermediate location and the second end to the intermediate location has a positive slope with respect to the longitudinal axis; and an outer shell formed of metal proximately and conformally covering said exterior surface of and having a formed circular opening surrounding each said first and second ends of said cylindrical body, wherein said cylindrical body, said outer shell and said circular openings are concentric with said longitudinal axis, said outer shell disposed about said cylindrical body after formation of said cylindrical body;

wherein said outer shell is formed by an assembly of stamped first end second thin-walled tubular shells having inside diameters, at first respective ends thereof, equal within a predetermined tolerance wherein said first respective ends are joined together and welded;

wherein said assembly further comprises a weld ring having an outside diameter smaller than said inside diameters of each said first respective end of said first and second thin-walled tubular shells by a predetermined value, said weld ring disposed between and nested within said first respective ends of first and second thin-walled tubular shells such that said shells are held in alignment during said welding;

wherein said weld ring further comprises a circular band formed of the same thin metal as said first and second thin-walled tubular shells.

* * * * *